US007570261B1

(12) United States Patent  
Edecker et al.

(10) Patent No.: US 7,570,261 B1  
(45) Date of Patent: Aug. 4, 2009

(54) APPARATUS AND METHOD FOR CREATING A VIRTUAL THREE-DIMENSIONAL ENVIRONMENT, AND METHOD OF GENERATING REVENUE THEREFROM

(75) Inventors: Ada Mae Edecker, Earlville, IL (US); Alex Slyanko, Klev (UA)

(73) Assignee: Xdyne, Inc., Earlville, IL (US)

( * ) Notice: Subject to any disclaimer, the term of this patent is extended or adjusted under 35 U.S.C. 154(b) by 146 days.

(21) Appl. No.: 10/793,614

(22) Filed: Mar. 4, 2004

Related U.S. Application Data

(60) Provisional application No. 60/452,735, filed on Mar. 6, 2003.

(51) Int. Cl.  
*G06T 17/00* (2006.01)

(52) U.S. Cl. .................. 345/420; 345/427; 345/582; 705/40

(58) Field of Classification Search .......... 345/420, 345/427; 463/22; 700/98  
See application file for complete search history.

(56) References Cited

U.S. PATENT DOCUMENTS

| 5,259,037 | A | 11/1993 | Plunk |
| 5,276,785 | A | 1/1994 | Mackinlay et al. |
| 5,301,284 | A | 4/1994 | Estes et al. |
| 5,362,239 | A | 11/1994 | Pfuetze |
| 5,467,444 | A | 11/1995 | Kawamura et al. |
| 5,675,746 | A | 10/1997 | Marshall |
| 5,767,855 | A | 6/1998 | Bardon et al. |
| 5,808,614 | A | 9/1998 | Nagahara et al. |
| 5,818,951 | A | 10/1998 | Schivley |
| 5,821,925 | A | 10/1998 | Carey et al. |
| 5,826,266 | A | 10/1998 | Honda |
| 5,835,094 | A | 11/1998 | Ermel et al. |
| 5,880,733 | A | 3/1999 | Horvitz et al. |
| 5,884,029 | A | 3/1999 | Brush, II et al. |
| 5,889,951 | A | 3/1999 | Lombardi |
| 5,900,879 | A | 5/1999 | Berry et al. |
| 5,903,271 | A | 5/1999 | Bardon et al. |
| 5,908,465 | A | * 6/1999 | Ito et al. ................. 701/211 |
| 5,911,045 | A | 6/1999 | Leyba et al. |
| 5,917,436 | A | * 6/1999 | Endo et al. ............ 340/995.14 |
| 5,923,324 | A | 7/1999 | Berry et al. |
| 5,926,179 | A | 7/1999 | Matsuda et al. |
| 5,946,664 | A | * 8/1999 | Ebisawa ................... 705/14 |

(Continued)

OTHER PUBLICATIONS

Microsoft Fligh Simulator 2000 Pilot's Handbook, 1999. Microsoft, pp. 20-21.*

(Continued)

*Primary Examiner*—Kee M Tung  
*Assistant Examiner*—Andrew Yang  
(74) *Attorney, Agent, or Firm*—K&L Gates LLP

(57) ABSTRACT

An apparatus and method for creating and using a virtual three-dimensional environment, and methods for generating revenue based on the virtual three-dimensional environment. The virtual three-dimensional environment includes a virtual three-dimensional city model which is a realistically accurate city environment including all the details of an actual city. Defined elements within the virtual city model serve to promote corresponding third-party businesses and related entities in the real world. Users interface with the virtual city model to explore the city and learn about or become more familiar with the defined elements within the virtual city model. The virtual three-dimensional city model which is realistically accurate of an environment also facilitates multiple other uses.

33 Claims, 22 Drawing Sheets

U.S. PATENT DOCUMENTS

| | | | |
|---|---|---|---|
| 5,956,038 A | 9/1999 | Rekimoto | |
| 5,958,012 A | 9/1999 | Battat et al. | |
| 5,973,697 A | 10/1999 | Berry et al. | |
| 5,974,876 A * | 11/1999 | Hijikata et al. | 73/178 R |
| 5,982,372 A | 11/1999 | Brush, II et al. | |
| 5,999,208 A | 12/1999 | McNerney et al. | |
| 5,999,994 A | 12/1999 | Lipkin | |
| 6,012,072 A | 1/2000 | Lucas et al. | |
| 6,014,145 A | 1/2000 | Bardon et al. | |
| 6,023,270 A | 2/2000 | Brush, II et al. | |
| 6,025,839 A | 2/2000 | Schell et al. | |
| 6,026,376 A | 2/2000 | Kenney | |
| 6,036,601 A * | 3/2000 | Heckel | 463/42 |
| 6,052,123 A | 4/2000 | Lection et al. | |
| 6,057,856 A | 5/2000 | Miyashita et al. | |
| 6,058,397 A | 5/2000 | Barrus et al. | |
| 6,064,389 A | 5/2000 | Berry et al. | |
| 6,081,270 A | 6/2000 | Berry et al. | |
| 6,081,271 A | 6/2000 | Bardon et al. | |
| 6,085,256 A | 7/2000 | Kitano et al. | |
| 6,088,032 A | 7/2000 | Mackinlay | |
| 6,094,196 A | 7/2000 | Berry et al. | |
| 6,119,147 A | 9/2000 | Toomey et al. | |
| 6,154,211 A | 11/2000 | Kamachi et al. | |
| 6,167,433 A | 12/2000 | Maples et al. | |
| 6,271,843 B1 | 8/2001 | Lection et al. | |
| 6,271,854 B1 * | 8/2001 | Light | 345/427 |
| 6,289,380 B1 | 9/2001 | Battat et al. | |
| 6,349,301 B1 | 2/2002 | Mitchell et al. | |
| 6,377,263 B1 | 4/2002 | Falacara et al. | |
| 6,381,583 B1 | 4/2002 | Kenney | |
| 6,386,985 B1 | 5/2002 | Rackham | |
| 6,408,307 B1 * | 6/2002 | Semple et al. | 707/104.1 |
| 6,476,830 B1 | 11/2002 | Farmer et al. | |
| 6,496,207 B1 | 12/2002 | Matsuda et al. | |
| 6,798,407 B1 | 9/2004 | Benman | |
| 6,912,565 B1 | 6/2005 | Powers et al. | |
| 6,976,027 B2 * | 12/2005 | Cutlip | 707/101 |
| 7,038,694 B1 | 5/2006 | Santodomingo et al. | |
| 7,085,648 B2 * | 8/2006 | Ishiguro | 701/208 |
| 7,218,318 B2 | 5/2007 | Shimazu | |
| 7,343,268 B2 | 3/2008 | Kishikawa | |
| 2001/0034661 A1 * | 10/2001 | Ferreira | 705/26 |
| 2002/0002491 A1 | 1/2002 | Whitfield | |
| 2002/0019699 A1 * | 2/2002 | McCarty et al. | 701/211 |
| 2002/0062360 A1 * | 5/2002 | Ishiguro | 709/219 |
| 2002/0128952 A1 | 9/2002 | Melkomian | |
| 2003/0117397 A1 * | 6/2003 | Hubrecht et al. | 345/420 |
| 2003/0207237 A1 | 11/2003 | Glezerman | |

OTHER PUBLICATIONS

Maxis, "Sim City 4" screenshot, Jan. 17, 2003.*
Groove Product Backgrounder (white paper, datasheet and groove brief) written by Groove Networks, Inc. published in 2001.
Abode Atmosphere (1.0 Browser User Guide) written by Abode Systems Incorporated published in 2001.
Virtual Worlds Platform 5—Product Specification written by blaxxum interactive published in 2001.
The Architecture of a Distributed Virtual Worlds System written by Microsoft Corporation published in 2000.
Dive: A scaleable network architecture for distributed virtual environments written by www.sics.se/emmanuel/publications/dsej/dsej.html published in Sep. 1998 (printed Oct. 11, 2001).
Distributed Virtual Reality—An Overview written by www.ece.uwaterloo.ca/~broehl/distrib.html published Jun. 1995 (printed Oct. 11, 2001).
Overview of Activeworlds written by www.activeworlds.com/overview.asp (Activeworlds Corp.) published in 1997-2001 (printed Oct. 11, 2001).
The 3D Entertainment written by www.worlds.com/3dcd/3dcdtech.html published date unknown (printed Oct. 11, 2001).

* cited by examiner

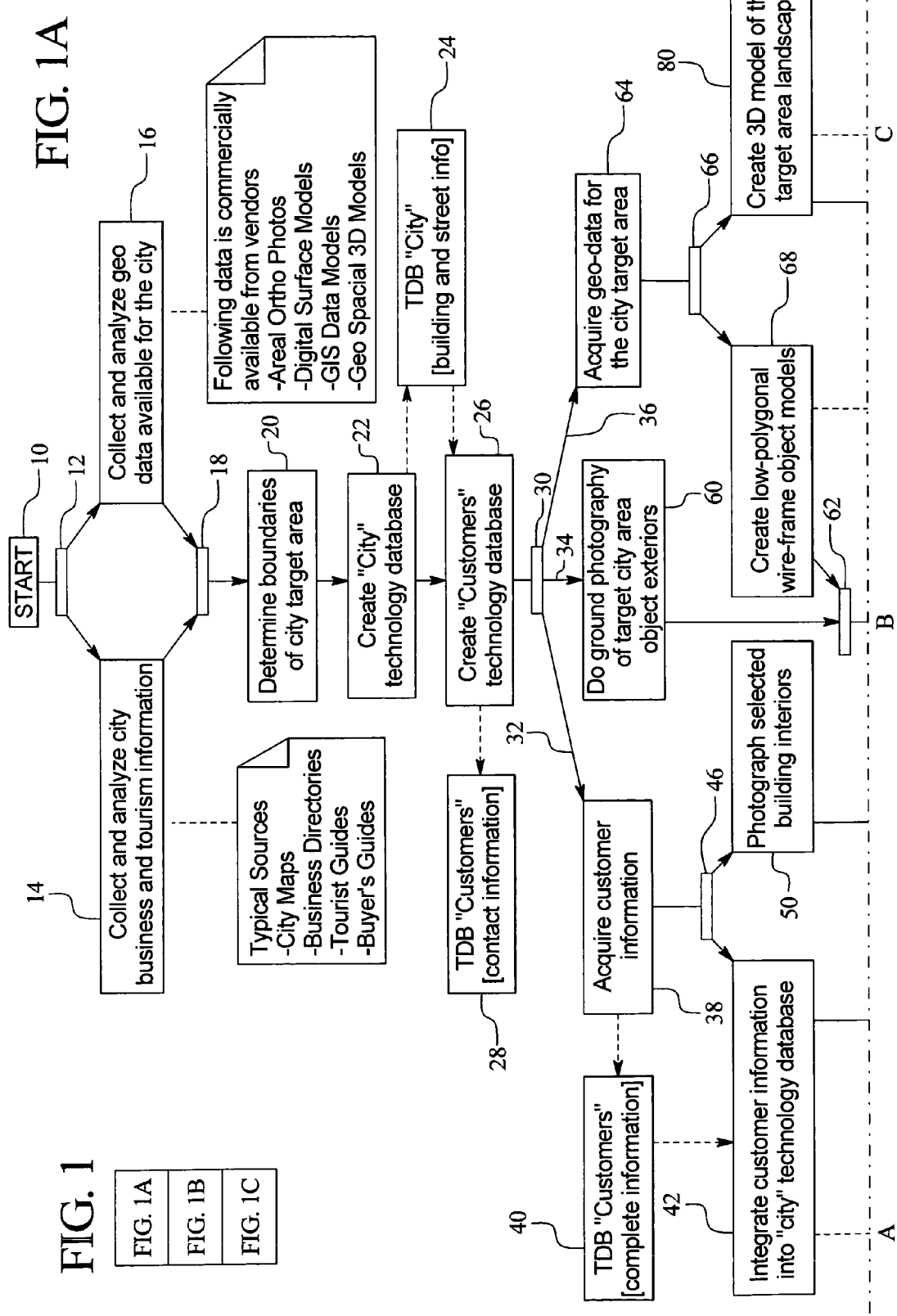

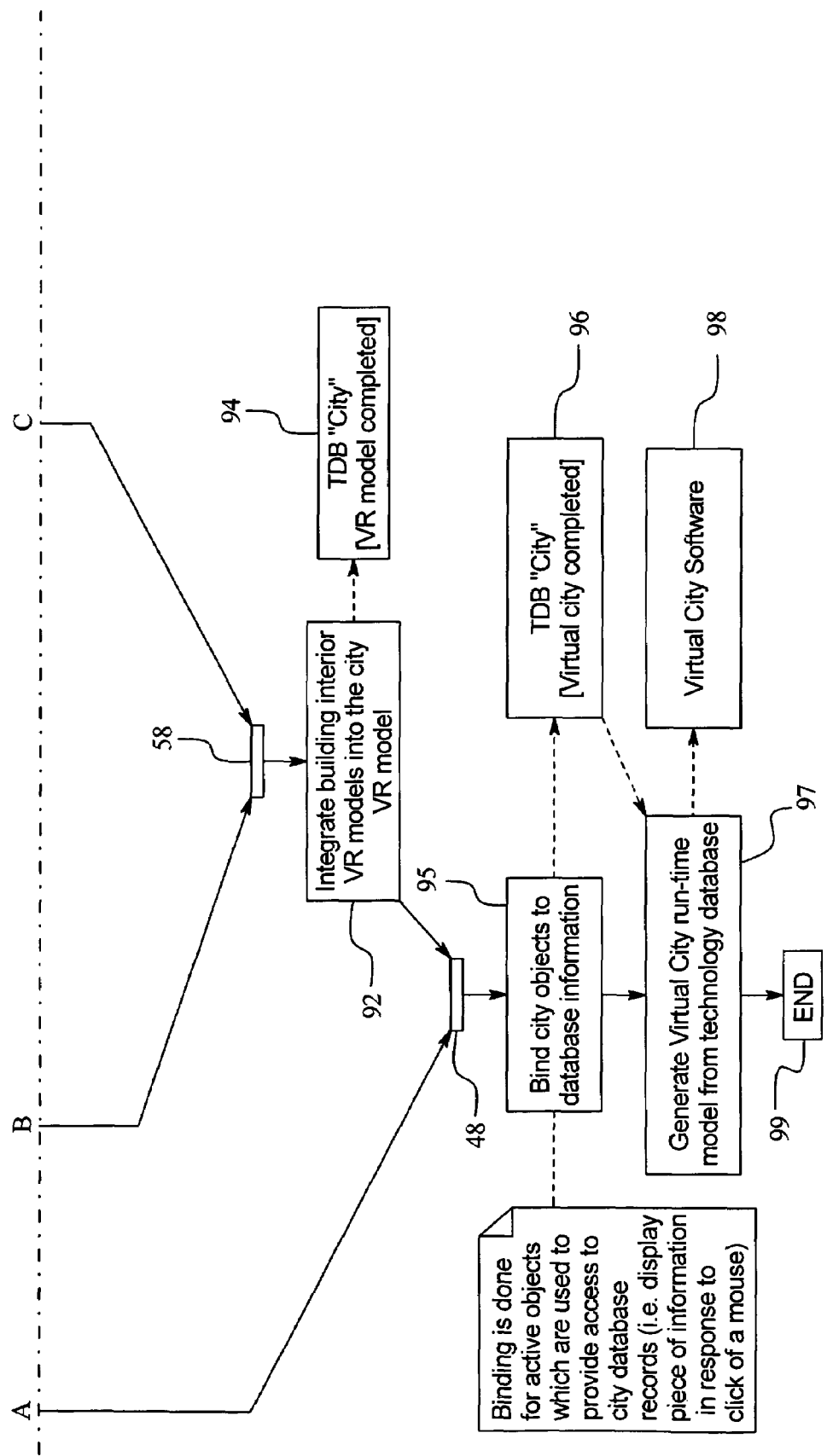

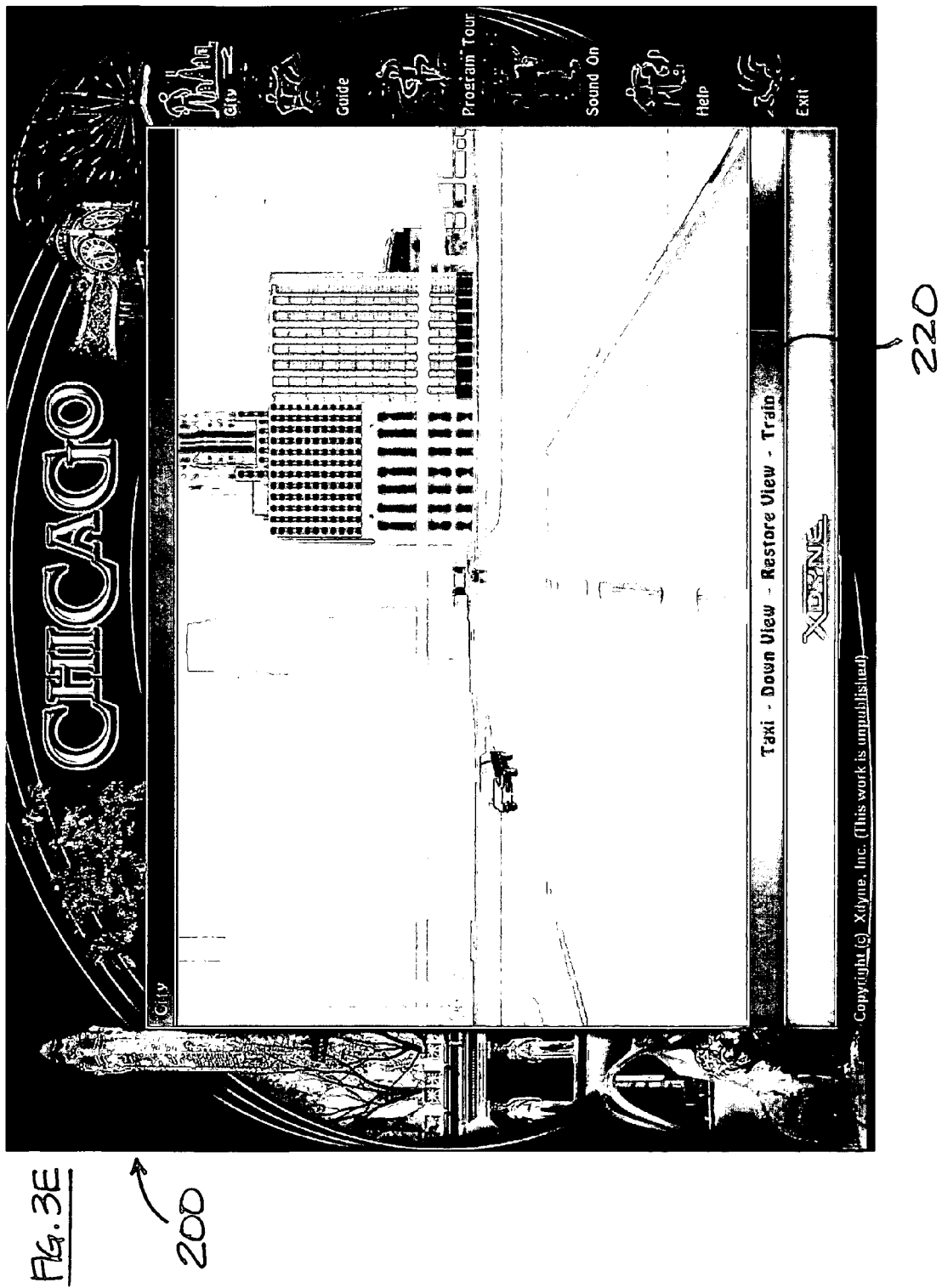

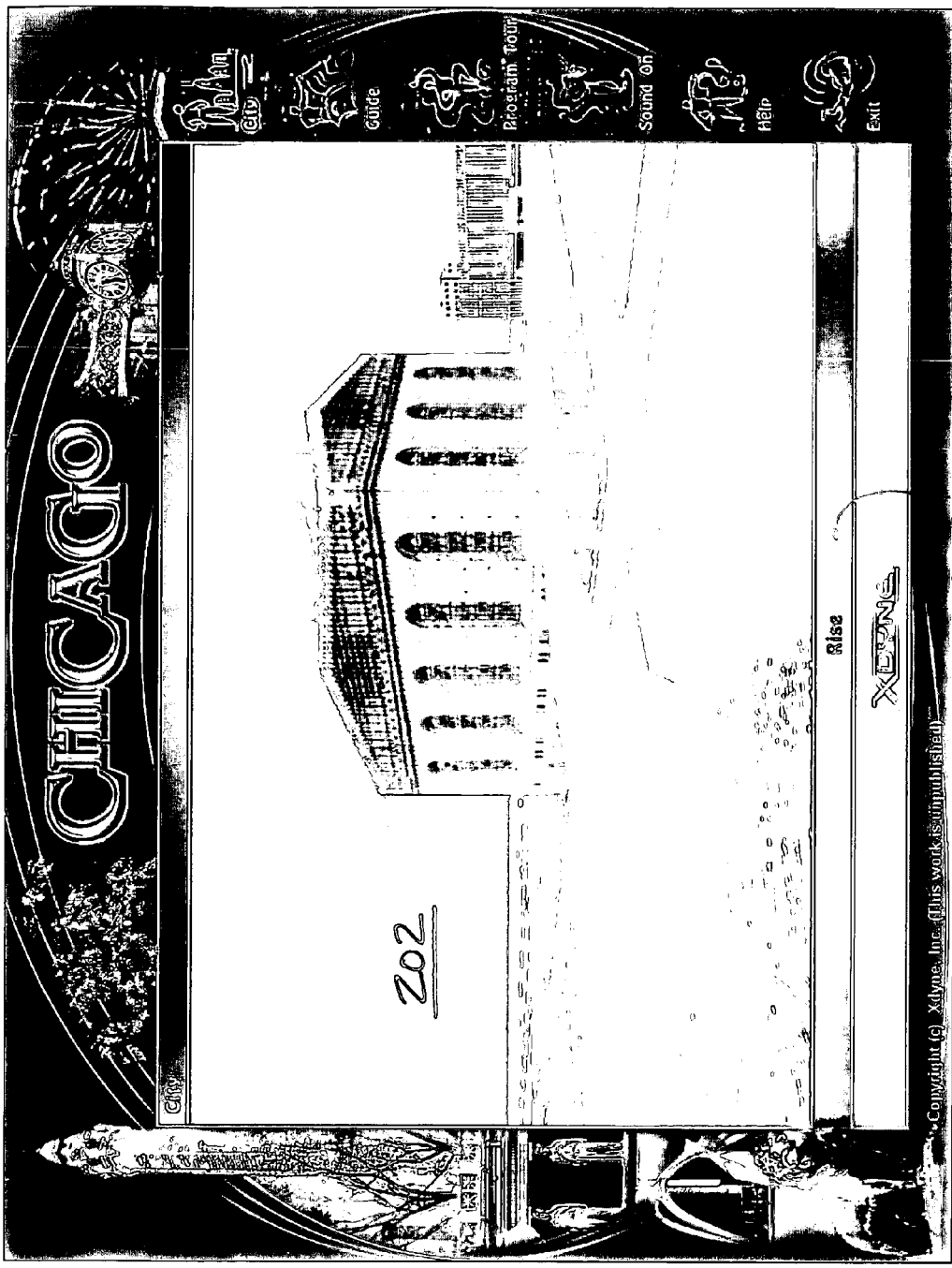

200

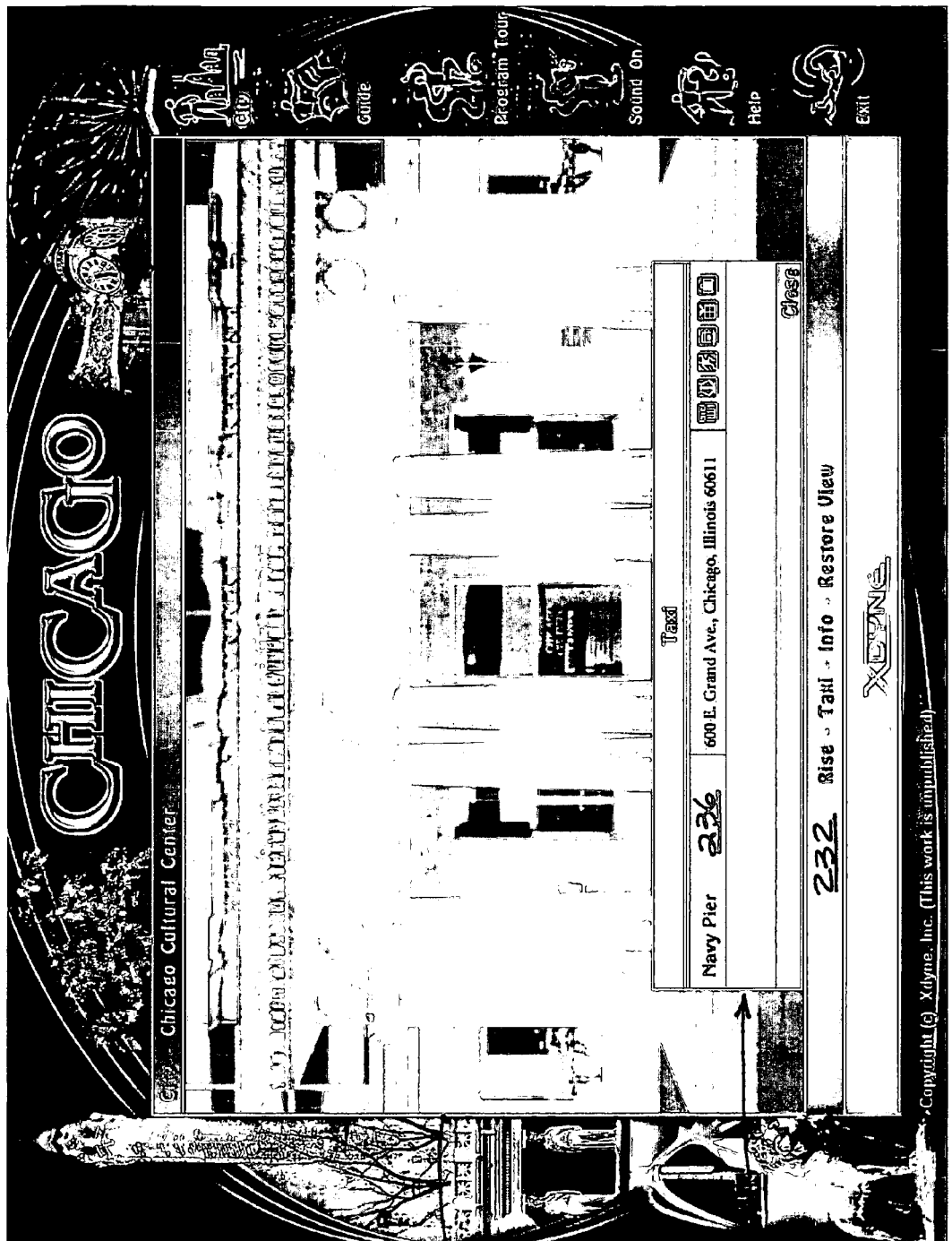

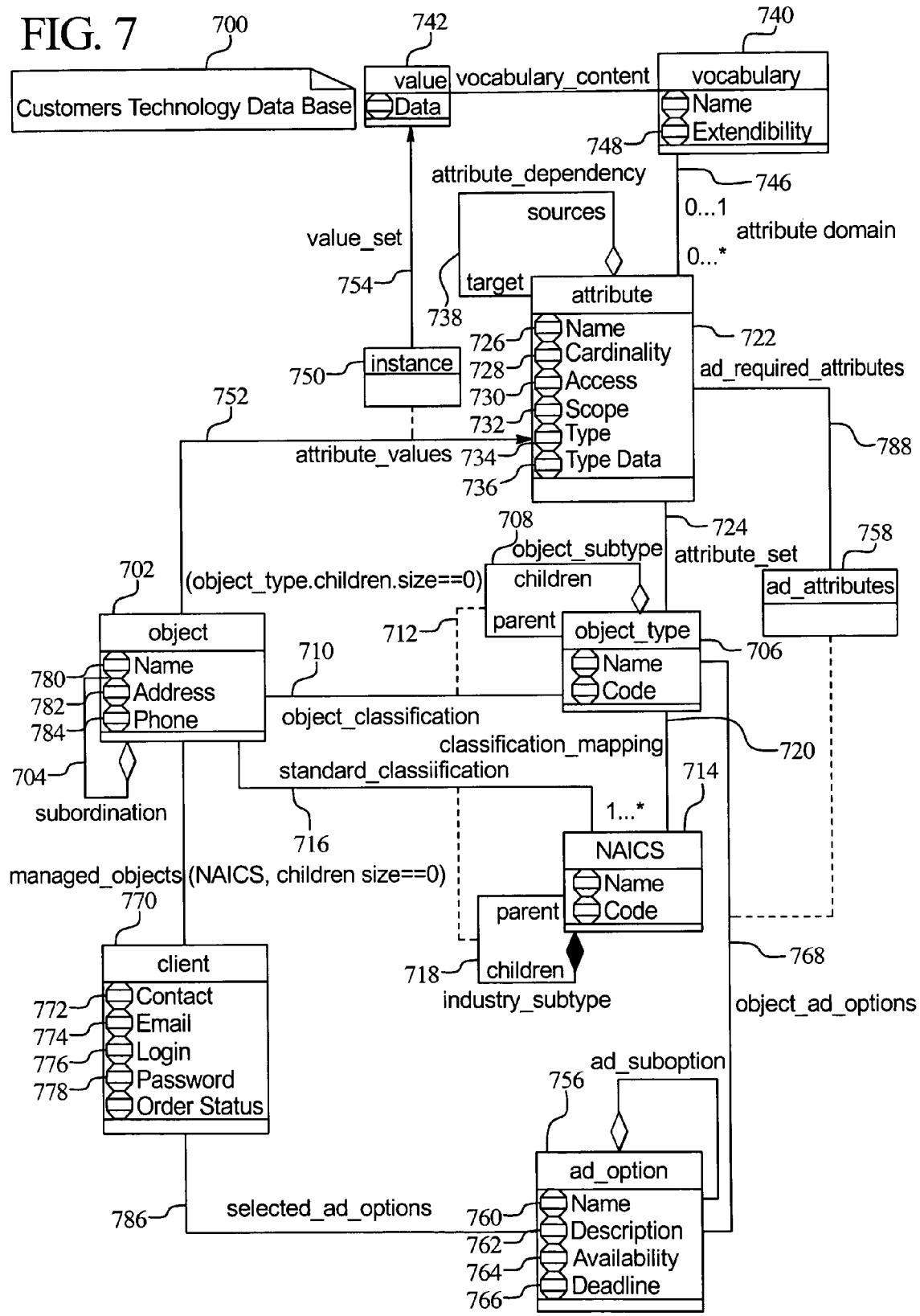

APPARATUS AND METHOD FOR CREATING A VIRTUAL THREE-DIMENSIONAL ENVIRONMENT, AND METHOD OF GENERATING REVENUE THEREFROM

PRIORITY CLAIM

This application is a non-provisional of, claims the priority to and benefit of U.S. Provisional Application Ser. No. 60/452,735, filed Mar. 6, 2003, which is incorporated herein in its entirety.

BACKGROUND OF THE INVENTION

The present invention relates in general to an apparatus and method for creating a virtual three-dimensional environment, and a method for generating revenue therefrom, and more particularly to an apparatus and method for creating a virtual three-dimensional model of a city based on actual physical data of the city, to an apparatus and method for using the virtual three-dimensional model of the actual city, and to a method of generating revenue based on the virtual three-dimensional model of the city.

The concept of virtual reality and the creation of virtual three-dimensional models are known. Generally, virtual three-dimensional models are created based on actual physical data of the modeled object, when available. However, many virtual models may not have a corresponding physical model or actual physical data may not be available. In the latter case, physical data is generally approximated and/or interpolated from available data, if any, in order to create the virtual three-dimensional model.

The concept of virtual reality extends to the creation of large virtual models such as virtual three-dimensional environments. Generally, a virtual three-dimensional environment will include a number of other virtual objects within the environment. As with the virtual models described above, these virtual environments may be based on actual physical data, when available. However, it is more likely in the case or virtual environments that a majority of the actual physical data may be approximated in creating the virtual environment. Moreover, many virtual three-dimensional environments are fictional environments which do not correspond to real-world environments, and therefore do not have corresponding physical data available for the modeling process.

A need exists to create a virtual three-dimensional model of an environment such as a city based on a majority of actual physical data of the corresponding environment. Moreover, a need exists to generate revenue from the virtual model of such environment. Specifically, it is desirable to provide businesses with new methods for generating revenue which include generating revenue based on business promotion and increased awareness of a business by illustrating the business in a virtual model in relation to other businesses and points of interest within the virtual environment.

There is also a need for a system which provides additional uses of three-dimensional environments which directly and accurately correspond to real-world environments such as cities which is not accomplished by current media forms or formats.

For example, information currently distributed within the tourism/retail market is exemplified by the numerous printed directories, area maps, telephone directories, and other print magazines and newspapers touting attractions and service offerings to various areas. These kinds of publications are readily known within the market so the concept is well known. However, there is growing user dissatisfaction with these publications. Much of the print information is not readily searchable and is static in nature such that it is old and obsolete shortly after publishing. Internet information is a growing source of searchable information but requires effort to sort through the volumes of information to find the particular information needed and such information is generally not geographically organized as it appears in the real world. Once found, getting information on surrounding attractions and transportation requires additional effort.

Thus, it should be appreciated that there is a on-going need in many fields and industries for computerized actual three-dimensional environments and systems which enable users to employ such actual three-dimensional environments.

SUMMARY OF THE INVENTION

The present invention overcomes the above shortcomings by providing an apparatus and method for creating and using a virtual three-dimensional environment, and a method for generating revenue therefrom.

In one embodiment of the present invention, the virtual three-dimensional environment is a virtual three-dimensional model of a city. To create the virtual three-dimensional model of the city, information relating to city elements is collected and analyzed. In addition, geographical data relating to the city is also collected and analyzed. The collected and analyzed information is used to outline a general city boundary. The general city boundary defines the physical boundary for implementing the virtual three-dimensional model of the city.

Once the boundary of the virtual city model, that is, the city target area has been defined, the virtual city model is created. Creating the virtual city model includes acquiring further information pertaining to city elements as well as further geographical data corresponding to the city target area. This information and data is used in creating three-dimensional models of the city element interiors and exteriors as well as terrain within the city target area.

The completed virtual city model in one embodiment includes a plurality of the city elements that are present in the corresponding real-world city target area. The present invention enables end users of the virtual city model to navigate the virtual city model to experience what it would be like to actually visit the real-world city target area. Users are able to explore the virtual city model and to build a sense of familiarity with their surroundings in the virtual city model. In addition to merely exploring the virtual city model, the users are able to interact with a plurality of city elements. This interaction enables the user to further explore and become familiar with the city target area.

Enabling users to build familiarity with an area of a real-world city without actually or before being in the real-world city is advantageous. For example, if a user is planning a pleasure or business trip to a city, the user can become familiar with layout of the city before actually travelling to the city. In this example, the user can virtually explore the area around their intended hotel and virtually travel to restaurants and tourist attractions within walking distance of the hotel. In this manner, the user becomes more comfortable when actually going on the pleasure or business trip, without the cost of actually visiting the city beforehand. The user, who has never been to the city, thus feels as if they have already been to the city before their trip.

The sense of familiarity gained through virtually exploring the city model has broad application beyond merely planning a pleasure or business trip. Specifically, the virtual city model of this embodiment has broad applicability to industries and functions such as tourism, economic development, zoning, other city services, relocation, promotion and advertising. This wide applicability creates a large marketplace for the virtual city model of this embodiment.

The large marketplace for the virtual city model of this embodiment, in turn, drives methods of generating revenue from the virtual city model. In one embodiment, a method for generating revenue from the virtual city model includes developing a software product which includes the virtual city model. Money or other payment is solicited and collected from third-parties for their interests to be represented in the virtual city model software product.

Development of the software product continues in this fashion while money or other suitable payment is continually being solicited and collected from third-parties. The money collected from the third-parties funds the software development and helps to generate revenue. When the software development is completed or a state thereof is completed, the software product is distributed to end users. It should be appreciated that distributing the software product in one embodiment includes selling or licensing the software product.

In one embodiment, the software product of the above-described embodiment is continually updated and distributed. Money continues to be solicited and collected from interested third parties, thereby generating further revenue. Copies of the software product are updated and intermittently distributed to end users, and the development of the software product continues, thereby creating a dynamic virtual city model. The virtual city model thus adapts to changes in the real-world city and is able to grow over time.

In one embodiment, a method for generating revenue from the virtual city model includes defining a plurality of city elements in the virtual city model and leasing the defined city elements to real-world parties. Leasing the defined city elements thereby generates revenue. After the city elements have been defined and leased, the virtual city model is distributed to end users. It should be appreciated that distributing the virtual city model in one embodiment includes selling or licensing the virtual city model to end users.

In one alternative embodiment, city elements are continually defined and leased, thereby creating a dynamic or ever-changing version of the virtual city model which continues to generate revenue. Periodically, the virtual city model will be distributed or re-distributed to end users. It should be appreciated that later distributed versions of the city model will include additional or changed city elements and will be more updated than earlier distributed versions of the virtual city model. Eventually, the virtual city may include all or substantially all of the city elements of the real-world city and may thereafter change as the city changes. Accordingly, the present invention provides a virtual city which replicates an actual city in geographic appearance and in the inclusion of a great number if not all of the city elements or significant city elements. It should be appreciated that the term "city" as used in the present invention is meant to includes any suitable geographic region as discussed below.

Additional features and advantages of the present invention are described in, and will be apparent from, the following Detailed Description of the Invention and the Figures.

BRIEF DESCRIPTION OF THE FIGURES

FIGS. 3A 3B, 3C, 3D, 3E, 3F, 3G, 3H, 3I, 3J, 3K, 3L and 3M are example screen shots of an interface for a three-dimensional virtual model of a city according to one embodiment of the present invention.

FIG. 7 is a diagram illustrating one embodiment of a customers technology database.

DETAILED DESCRIPTION OF THE INVENTION

Creating the Virtual Reality Three-Dimensional Environment

Figure 1B:
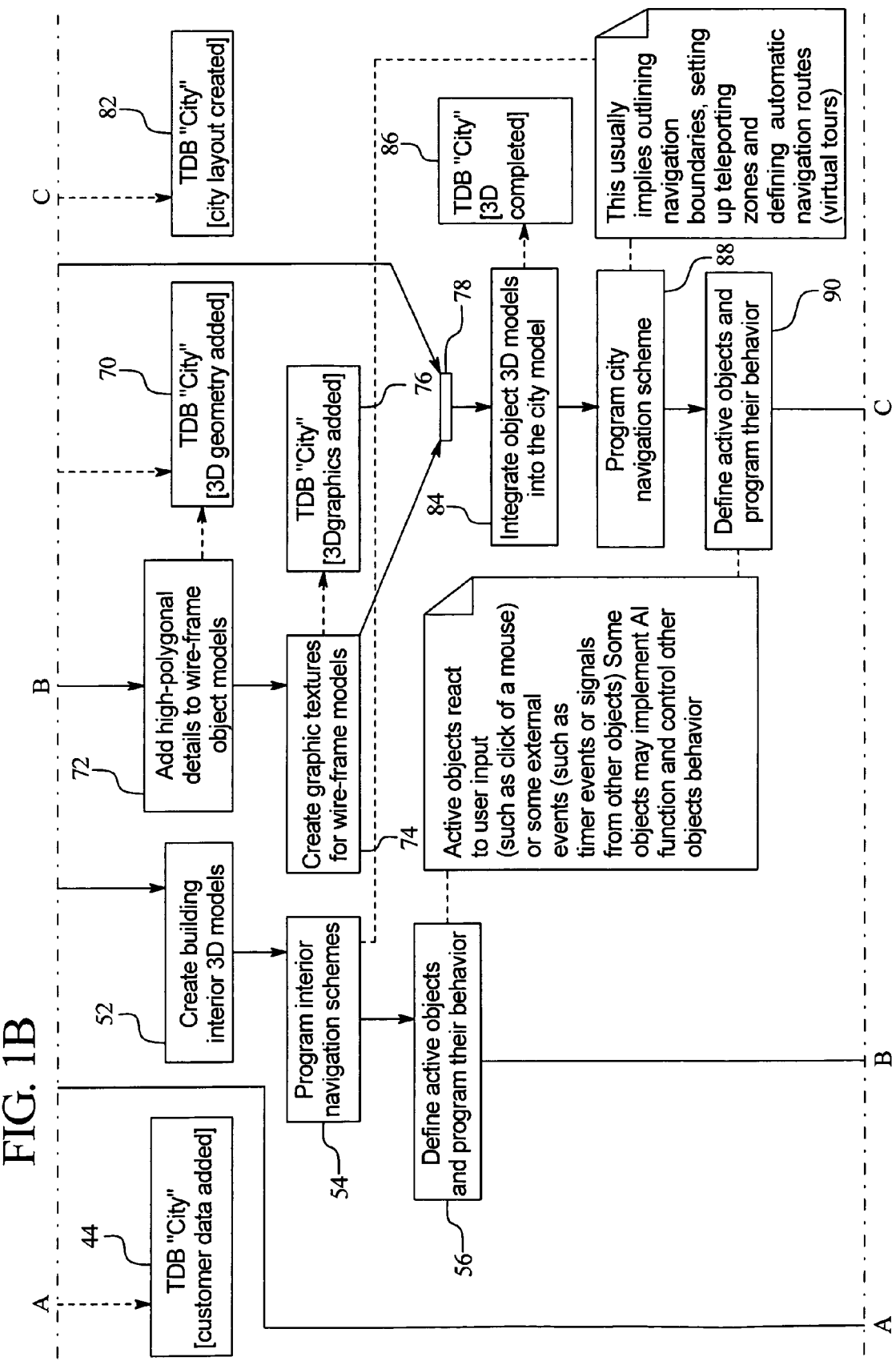
FIG. 1 is a flowchart illustrating one embodiment of a method for creating a three-dimensional virtual model of a city.

Referring now to FIG. 1, a flowchart generally illustrates one embodiment of a method for creating a virtual three-dimensional environment in accordance with the present invention. In this embodiment, the virtual three-dimensional environment is a virtual three-dimensional model of an actual city.

In this embodiment, the flowchart shown in FIG. 1 is variation of a Unified Modeling Language™ (UML) Activity Diagram. It should be appreciated that UML is well known in the computer field as a language for specifying, visualizing, constructing, and documenting software systems and the like and that it is used in part to simplify software and related design processes. In addition, UML diagrams can be used for database design, thereby allowing, for example, a business and an application team who are using UML for their designs to share a common language and to communicate with a database team. In this regard, UML can be used as a common modeling language, thereby linking various business teams, design groups and the like. However, it should be appreciated that the embodiments discussed herein are not limited to the use of UML and its terminology.

As discussed above, the virtual three-dimensional environment in this embodiment is a city. However, it should be appreciated that in alternative embodiments, the virtual three-dimensional environment could be any suitable environment such as a town, a village, a province, a county, a state, a country, a ward, a community, or an other suitable geographic location. Moreover, it should also be appreciated that the virtual three-dimensional environment in further alternative embodiments could also be a geographic subset of a larger geographic location. Examples of such a geographic subset include a university campus, a shopping center, a sports complex, and the like. The term city is used herein to be inclusive individually or jointly of all of the above.

In this embodiment, information relating to a plurality of city elements including business and tourism elements is collected and analyzed. In addition, geographical data relating to the city is also collected and analyzed. The analyzed results are used to select a general city boundary, that is, a city target area. The city target area defines the physical boundary for implementing the virtual three-dimensional model of the city.

Select actual city elements within the city target area are defined and information relating to these actual city elements is attached or made accessible through the city element itself. In addition, a plurality of actual city elements within the city target area are included in the three-dimensional model of the city, thereby making the three-dimensional model of the city more realistic and more of an actual representation of life within the city target area. In this, manner, a user can explore and use the city target area through the three-dimensional city model and feel as if they are actually visiting the city target area.

Creation of the virtual three-dimensional city model starts at start block 10 as illustrated in FIG. 1. Synchronization bar or dividing bar 12 illustrates that separate but general actual city information is collected and analyzed as illustrated by blocks 14 and 16. In this embodiment, the collection and analysis of information illustrated by the blocks 14 and 16 is completed simultaneously. However, it should be appreciated that the information can be collected and analyzed either simultaneously or in a staggered or predetermined chronological order. Moreover, it should also be appreciated that any task illustrated by blocks that follow a dividing bar in this embodiment can be completed either simultaneously or in a staggered or predetermined chronological order.

Information relating to city elements including city business and tourism information is collected and analyzed as indicated by the block 14. It should be appreciated that this information can be collected from a number of suitable different sources. For instance, paper and electronic city maps, business and other directories, tourist guides and buyer's guides provide large volumes of data relevant to city elements. Internet websites are one example of a source of such relevant information.

City elements include actual things found in an actual city such as but not limited to businesses, buildings, attractions, services, facilities, objects, and inhabitants. It should be appreciated that the city elements listed may overlap. For example, a business may occupy an entire building or an attraction can also be a business. In addition, the above listed elements are not meant to be exhaustive of all conceivable and suitable city elements.

Businesses as city elements include but are not limited to professional offices, trade offices, banks, factories, real estate offices, hotels, motels, restaurants, diners, coffee shops, bars, night clubs, casinos, stores, shops, malls, and salons. Buildings include but are not limited to skyscrapers, towers, temples, churches, halls, apartments, house, condominiums, theaters, libraries and museums. Attractions include theaters, museums, architectural landmarks, prominent and/or historical buildings, sculptures, art galleries, aquariums, planetariums, sports stadiums, scenic vistas, amusement parks, fountains, beaches, bodies of water such as rivers, lakes, and canals, and other similar venues and points of interest.

Services as city elements include but are not limited to city services such as police, fire and emergency services; transportation services such as taxis, buses, trains, trams, shuttles, and subways; medical services such as hospitals, urgent care centers and doctor's offices; and academic services such as schools, universities, libraries and colleges; and religious services such as temples, churches, synagogues, chapels, mosques and other like places of worship.

Facilities include but are not limited to meeting places such as plazas, squares, convention centers, convocation centers, stadiums and arenas; and transportation facilities such as airports, train stations, bus depots and taxi stands.

The information collected and analyzed includes information that is suitable to an end user of the virtual city model. Thus, it should be appreciated that the information which is collected and analyzed can be tailored and customized based on the intended audience or intended use. Moreover, the number of city elements for which information is collected can also be based on the intended audience or intended use. For instance, if the core audience in one embodiment is made up primarily of tourists, a large portion of the information collected and analyzed might be focused on tourist attractions. In another example, if the intended use is zoning, the information can be primarily roads, building and other city infrastructure.

The city element information collected and analyzed, in one embodiment includes, the type, function, the address and general location of the city element as well as its hours of operation, phone number(s), contact information and Internet website address. Further information may also be collected and analyzed such as transportation information with respect to the city element, the availability of nearby parking, handicapped access capabilities, a general description of the city element, and other useful and descriptive information concerning the city element.

Meanwhile, available geographic data for the city is collected and analyzed as indicated by the block 16. Geographic data includes data that records the shape and location of a feature as well as any associated characteristics that define and describe the feature. Generally, geographic data is processed using suitable computer systems for capturing, storing, checking, integrating, manipulating, analyzing, and displaying data related to positions on the Earth's surface. A Geographic Information System (GIS), or Spatial Information System (SIS), is typically used for handling various types of maps, which might be represented as several different layers where each layer holds data about a particular kind of feature. Generally, each feature is linked to a position on the graphical image of a map.

Actual geographic data is commercially available from a number of vendors including Vexcel, Urban Data Solutions, and Kodak. Examples of commercially available geographic data include aerial orthophotographic images, GIS data models, SIS data models, digital surface models, and geo-spatial three-dimensional models. Geographic data such as that listed above is collected from a suitable number of sources and subsequently analyzed.

Synchronization bar or joining bar 18 indicates that in this embodiment, all activities above joining bar 18 must finish before any activities beneath joining bar 18 can begin. Thus, after collecting and analyzing the geographic data and the city element information in blocks 14 and 16, the boundaries of the city target area are selected as illustrated by block 20. The boundaries selected for the city target area will determine the coverage area for the virtual city model.

The boundaries of the city target area can be determined using any suitable techniques. In one embodiment, the boundaries of the city target area are determined by analyzing a plurality of tourist maps of the city and defining the boundaries based on commonality of areas between the plurality of tourist maps. It should be appreciated that there are many suitable alternative techniques for determining the boundaries of the city target area. For instance, it might be desirable to compare and contrast transportation maps with tourist maps in order to determine the target boundaries, just as it is might be desirable to determine the boundaries based on the availability of higher quality geographic data for the city.

In addition to determining the coverage area for the virtual city model, it may be necessary to further define the contents of the coverage area. In this embodiment, the coverage area for the virtual city model includes an inner or detailed area and an outer or undetailed area. The outer area includes the boundaries of the modeled city streets layout, while the inner area, which lies inside the outer area, defines the boundaries of modeled city action blocks, that is, modeled streets, buildings, objects and the like.

Figure 2A:
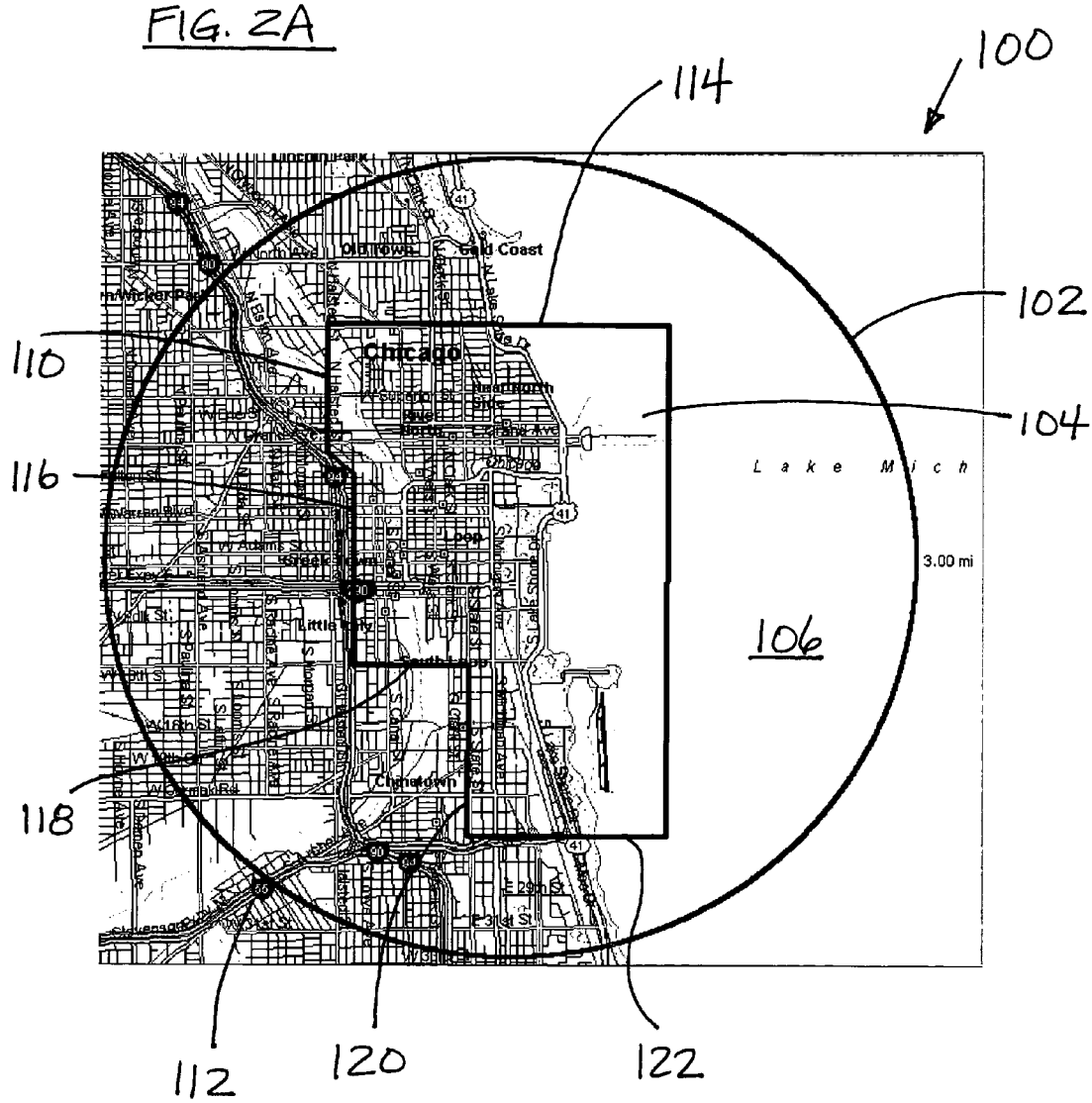
FIGS. 2A and 2B are diagrams illustrating an inner area and an outer area of a virtual city model in one embodiment.

An overhead map 100 of a portion of a city is illustrated in FIG. 2A. The city used for this example is Chicago, Ill., USA. Included within the overhead map 100 are an outer area 102 and an inner area 104. In this embodiment, the outer area 102 defines a portion of the city which includes a lake 106 while the inner area defines a subset of the outer area 102 that excludes the lake 106. Thus, it should be appreciated that the outer area 102 defines the general or less detailed coverage area for the virtual city model, while the inner area 104 defines the more detailed coverage area for the virtual city model.

The approximate boundaries, excluding the lake 106, for the outer area 102 in a counterclockwise direction starting from North are North Avenue 108, Halsted Street 110 and Stevenson Expressway 112. The approximate boundaries for the inner area 104 in a counterclockwise direction starting from North are Division Street 114, Kennedy Expressway 116, Roosevelt Road 118, State Street 120, Cermak Street 122, and the shore of the lake 106.

The average inner area 104 size in city blocks from North to South is forty city blocks, and fifteen city blocks from East to West. The approximate total number of city blocks in the inner area 104 is six hundred city blocks. The average number of buildings on each city block in the inner area 104 is five buildings. The total number of modeled building is about three thousand buildings. The size of the inner area 104 in square miles is about five square miles.

Figure 2B:
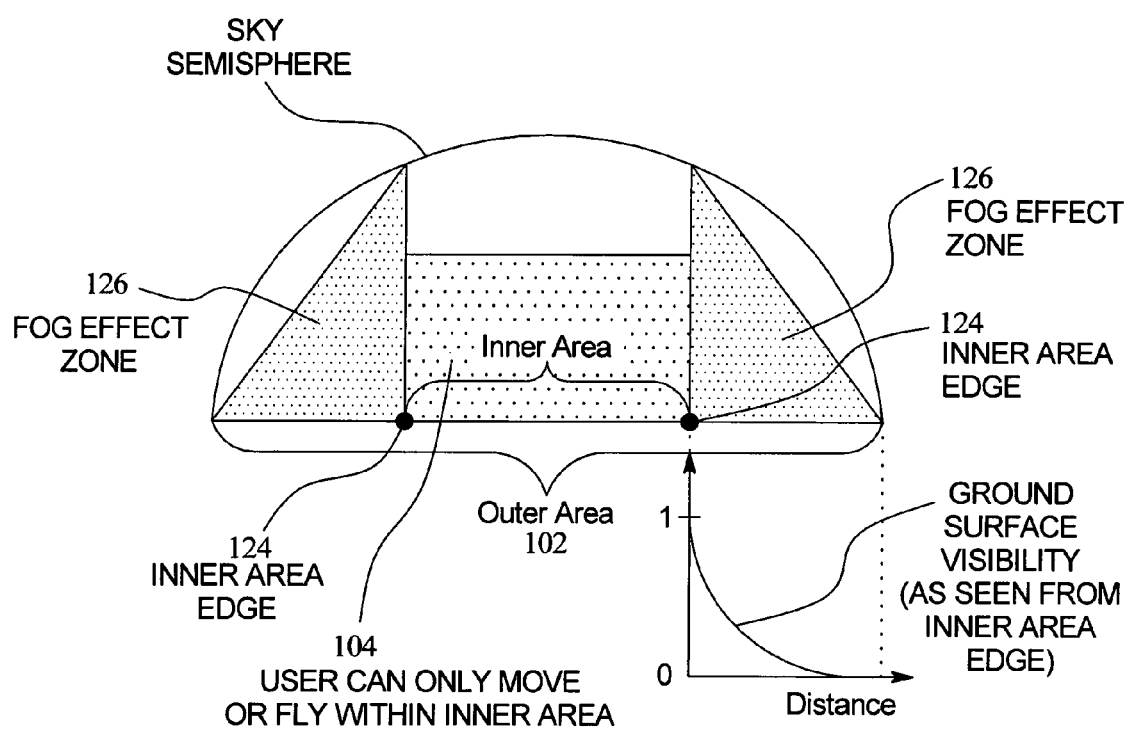

Referring now to FIG. 2B, a side view of the inner area 104 and the outer area 102 is illustrated. The outer area 102 in this embodiment is defined such that it avoids sharp margins in the modeled area where streets and the like turn into dead-ends at edges 124 of the inner area 104. Thus, the outer area 102 which surrounds the inner area 104 introduces a visual effect such that the edges 124 of the inner area 104 are faded out via fog effect zones 126. Thus, the virtual city model in this embodiment appears to be surrounded by fog at a distance and no streets or the like have visual sharp dead-ends.

In addition, employing the visual effect of this embodiment decreases the size of entire virtual three-dimensional model since terrain leading away from the outer area 102 need not be modeled. However, objects inside the outer area 102 such as streets and the like still remain identifiable and can be used to provide information to a user of the virtual city model.

After defining the city target area, a city technology database is created as illustrated by block 22 of FIG. 1. In this embodiment, the city technology database includes building and street information as indicated by data object box 24. While the city technology database is being created and compiled, creation of a customers technology database also preferably begins as illustrated by block 26. The customers technology database includes customer contact information as indicated by data object box 28.

Referring now to FIG. 7, one embodiment of the customers technology database 700 is illustrated. The customers technology database 700 includes a plurality of classes and relationships. Object class 702 contains basic information such as contact information about a city element including a city object or place such as a business or other city entity. Information for records of object class 702 are primarily gathered during preliminary collection of information as illustrated by block 26 of FIG. 1. Sources for this preliminary information include, for example, yellow pages and mailing lists. However, further information may be added at a later step in the method illustrated in FIG. 1.

Referring back to FIG. 7, records of object class 702 may be interconnected via subordination relationships 704. For example, a record pertaining to a large corporate entity can be interconnected to each of its individual branch locations or entities. This subordinated relationship 704 is important because it facilitates the handling of corporate advertising options where a corporation may choose an option to provide a single informational presentation such as a multimedia presentation or a website link, which will be shared by all related subsidiary business places represented in the virtual city model, while all other advertising information will be submitted by these subsidiaries independently.

Object_type class 706 includes instances or records which are interconnected via object_subtype relationship 708 and form a user-oriented classifier of city places. In this embodiment, there is only one top level class record in this classifier with regard to object_subtype relationship 708 which is referred to as a root record. A second level record is represented by major places or business categories, for example, "shopping," "wining and dining," "professional and business services" and the like. A next level record contains a more detailed classification than above levels. In general, the number of levels is not restricted but will typically not exceed three.

It should be appreciated that some of the lower level types may belong to more then one higher level type. For example, a business type "car rental service" may belong both to "business and professional services" and "transportation" types. The actual contents and structure of this user-oriented classifier depends on the scope and purpose of the virtual city model and will, of course, vary for different embodiments.

Each object class record 702 must have at least one defined object_type class record 706 that it belongs to. Thus, each object class record 702 must be connected to a certain object_type instance or record 706 via object_classification relationship 710. Moreover, this object_type instance 706 must be at a lower level of classifier, that is, it should not have children or subtypes as illustrated by formal constraint 712 (i.e., object_type.children.size==0).

NAICS class 714 instances or records represent a North American Industry Classification system (formerly SIC). Each object class instance or record 702 must have at least one NAICS class instance 714 connected to it via standard_classification relationship 716. Unlike object_type instances 706, instances of NAICS class 714 are organized in a strict hierarchical manner via industry_subtype relationship 718. NAICS classification may be used as an alternative method for business oriented product users who may choose to lookup city objects according to NAICS classification.

Two classifiers are mapped to each other via classification_mapping relationship 720, such it is easy to switch between classifiers, as well as to automatically determine an object type for a particular business based on its NAICS code and thus, to automatically build object_classification relationship 710. Using mailing lists to provide information for the records and instances of the customers technology database 700 will provide an advantage in one embodiment since mailing lists usually provide NAICS or SIC codes for each listed business.

Class attribute 722 contains descriptions of attributes for object types declared in object_type class 706. Each object type has a set of attributes assigned to it via attribute_set relationship 724. An actual set of attributes depends on object type. For example, for object type "Restaurant", possible attributes will include "Name", "Address", "Working Hours", "Cuisine", "Price Range", "Smoking Allowed" (Yes/No), and the like. Attributes defined for each lower level object type are inherited from higher level or parent object types. Attribute inheritance is a standard Object Oriented Programming (OOP) mechanism.

With the exception of name parameter 726 there are several important parameters defined for attribute class 722. Parameter cardinality 728 defines whether this attribute is a single (i.e., one value) or multiple (i.e., array of values). For example, attribute "Payment Method" for object "Restaurant" will be multiple with possible values of such an attribute being, for example, "Cash", "Visa" or "Check" for a first restaurant or just "Cash" for a second restaurant.

Access parameter 730 defines access rights for a customer or client, or a user using the virtual city model. Examples of access rights include invisible, read only or full access. Some object attributes should not be visible to a client, since they are completed, accessed, modified and used only by company staff for internal processing. For example, an attribute "Art Designer" will hold the name of a designer responsible for processing graphics materials submitted by clients and this attribute might be used for project management purposes only.

Some attributes will be completed by company staff and should not be changed by clients. For example, an attribute "Company Logo" may contain final graphics for a client logo, which was created by a company designer in accordance with materials submitted by client. Thus, a client may be able to access an online account and see the final logo rendering, but can not change the final logo rendering.

Scope parameter 732 defines whether an attribute is final (i.e., it will be used in a finished copy of the virtual city model), or whether an attribute is merely a technology parameter used in the data preparation phase. For example, "Company Logo Draft" is a temporary technology parameter used in the data preparation phase as it may be a graphics file submitted by a client, which will be used by an art designer to create company final logo graphics according to system requirements. Conversely, the attribute "Company Logo" described above is a final parameter which will be incorporated into the virtual city model, and displayed on a user's screen.

Type parameter 734 defines which type of data an attribute will store. Typical values may include, for example, simple data types like "Integer", "Float" or "Text", or more complex data such as "Windows Bitmap File" or "Word Document File". TypeData parameter 736 may store specific constraints for attribute type 734. For example, for attribute type 734 "Text", TypeData parameter 736 could be maximum text length, or for "Windows Bitmap File", it could be a specified width and height in pixels of the bitmap. This kind of data is read and interpreted by program classes, which implement particular data type. These classes should have methods for creating, reading and storing attribute values.

Some attributes may be interconnected via attribute_dependency relationship 738. This relationship usually exists between final and intermediate or technology attributes, and defines which source attributes are needed as input values to create or produce target attribute as output. The process of creating target attribute value can be either automatic (e.g., implemented by program class) or manual.

By way of example, for automatic creation, a client could submit as part of the client information set (which includes all relevant information about a client such as a business) a picture of the client's business place as a bitmap file which the client wants to be used as a part of wallpaper for the client's business passport screen. The bitmap file would then be stored as a value of the attribute "Passport Wallpaper Photo". Another attribute "Passport Wallpaper Texture" is a technology attribute which value is predefined for a particular type of object. Once these two values are set, a method of creating passport wallpaper can be launched for automatically setting the value of target attribute "Passport Wallpaper". Thus, the value of target attribute will be a bitmap image generated from the two source images by, for example, mixing them according to a certain algorithm.

By way of further example, for manual creation, a client could submit as part of the client information set (which includes all relevant information about a client such as a business) a scanned image of client's business card including a corporate logo. This submitted image would stored as a value of "Company Logo Draft" which is connected with "Company Logo" attribute via attribute_dependency relationship 738. Once this value is set, a system reminder can be generated and processed to inform a graphics designer that input materials for creating a logo are in place and that the graphics designer can start the job of creating the logo.

Some attributes known as descriptors may have a finite set of permissible values. On a user interface level, these attributes are usually represented by drop-down boxes or similar user interface elements that enable a user to choose one or several values from the list, and in some cases to add a new value to the list. Such sets of values are represented by vocabulary class 740. Vocabulary class 740 is a container class linked to a set of vocabulary values 742 via vocabulary_content relationship 744. In addition, vocabulary class 740 is also connected to at least one instance of attribute class 722 via attribute_domain relationship 746. Each attribute instance 722 may be connected to not more than one vocabulary class 740.

Parameter extendibility 748 defines whether a set of vocabulary values which can be extended by a client. One example of extendable vocabulary is a set of keywords. For example, each client may choose a set of keywords for the client's business and add them to a vocabulary Keywords. Based on the content of this vocabulary, a global index will be generated which will enable users of the virtual city model to lookup businesses and the like by associated keywords. One example of non-extendable vocabulary is a set of values such as "Yes" and "No" for object "Restaurant" attribute "Smoking Allowed".

Class instance 750 is a container for actual attribute values 752 for each object instance 702, and is connected with attribute values 742 via value_set relationship 754. Depending on attribute multiplicity, instance object 702 can contain one or several attribute values 742. Some of these values can belong to a certain vocabulary if a corresponding attribute 722 has associated vocabulary 740. Instances of these classes can be completed online by clients or by company staff in the method illustrated in FIG. 1.

Ad_option class 756 and ad_attributes class 758 includes records or instances which contain information about advertising options. Each advertising option 756 includes the following parameters, name 760, description 762, availability 764, and deadline 766. Description parameter 762 includes pricing and technical requirements information while availability parameter 764 defines whether an advertising option is still available. Some advanced advertising options may become unavailable because of development time or other development limitations and the like. Deadline parameter 766 defines an information submission deadline for the advertising option. After a specified date, an advertising option will automatically become unavailable, even if it was chosen beforehand but the required data was not submitted by a client in a suitable time to meet the deadline.

Each ad_option instance 756 is connected to a set of object -type instances 706 for which it was designed via object_ad_options relationship 768. Different types of objects may have different sets of advertising options available. For example, media companies such as newspapers or magazines may have an option to set up virtual newsstands throughout the virtual city model and this option would not be available for other types of objects for obvious reasons.

Ad_attributes class 758 is a container class for holding references to all object type attributes 722 required for a certain option. The attributes identified by ad_attributes class 758 should be filled out either by a client or by company staff depending on the nature or the attribute.

Client class 770 holds information about clients or advertisers. Each client may access a certain part of technology database an online via front-end web interface and fill out, lookup or modify their respective information. Examples of client actions are described below.

A client or potential client can "Sign On" logging onto a related website and signing on as a client. Upon initial sign-in, an instance or record of client class is created. A client then enters contact information 772 and email information 774. In response, the system generates and emails login information 776 and password information 778 back to the client.

Once a client logs on to the website and enters their respective login information 776 and password information 778, the client account web page is opened. Next, the client identifies an object or objects 702 that the client would like to have advertised in the virtual city model. For each object 702 the client would like to advertise in the virtual city model, the client must enter the object's name 780, address 782 and phone 784. A new instance or record is created for each object unless the record of the object already exists because it was identified by company staff as illustrated by block 26 of FIG. 1.

After creating or updating the object record, the client picks one or several object types for the registered object or business. Picking object types can be accomplished via an object user-friendly classifier or via standard NAICS classifier at the client's choice. After picking object types, instances of object_classification 710 and standard_classification 716 relationships are created by the system.

Next, the client chooses advertising options. Preferably, the client should choose advertising options for each created object instance. List of available advertising options will be retrieved by the system from the database via object_ad_options relationship 768 and displayed to the client along with descriptions of the advertising options. Only options designed for a particular chosen object type and currently available options based on availability 764 and deadline 760 parameters will be displayed. For each chosen option, an instance of selected_ad_options relationship 786 will be created between client 770 and ad_option instances 756.

The system then uses ad_attributes class instance 758 and ad_required_attributes relationship instances 788 to retrieve the list of all required object attributes 722. All such attributes 722 will be connected to the object instance 702 via attribute_values relationship instances 752 and an instance of instance container class 750 will be created. The system is now ready to accept client data.

To enter client data, the client logs on to website and proceeds to input information using, for example, a form on the web page. The system uses previously created instances of attribute_values relationship 752 to retrieve and display a list of attributes 722 and their values 742. If a client enters some attribute value 742 for the first time, the system creates value class instance 742 and connects it to instance container object 750 via value_set relationship 754. If an attribute 722 has an associated vocabulary 740, then the client will choose an attribute value 742 from already existing value instances 742, which belong to this vocabulary 740 and connect them to instance container object 750 via value_set relationship 754 in the same manner described above.

The city technology database is similar to the customers technology database in terms of structures of classes and relationships. However, the city technology database includes a plurality of records or instances related to city buildings, size, shape, location, textures, geometry and the like rather than city elements defined by clients and their respective attributes.

After creating and updating the city and customers technology databases, the method for creating the virtual city model divides into three larger action branches 32, 33 and 34 as indicated by dividing bar 30. The first action branch 32 deals primarily with customer related actions while the second action branch 34 and the third action branch 36 deal primarily with city related actions such as three-dimensional modeling of the virtual city model.

Under the first action branch 32, city element such as customer information is acquired is illustrated by block 38. The customer information acquired includes more detailed information concerning the customers in the customers technology database. Upon acquiring the customer information, the information in the customers technology database is then completed as indicated by data object box 40. The customer information is then integrated into the city technology database as illustrated by block 42. Integrating the customer information into the city technology database includes adding the customer data to the city technology database as indicated by data object box 44.

Preferably, while still acquiring and completing customer information as illustrated by the block 38 and the data object box 40, dividing bar 46 indicates customer information and data can be integrated and added to the city technology database as illustrated by the block 42 and the data object box 44. Thereafter, this integrated information and data is joined or merged, as indicated by joining bar 48, with information and data from each of the three action branches 32, 34 and 36.

In addition, as illustrated by block 50, building interiors of selected buildings are also preferably being photographed. The building interiors selected to be photographed in this embodiment include major commercial buildings, attractions, office buildings, residential and commercial real estate, government buildings, transportation depots, universities, hospitals and the like. In general, the building interiors being photographed serve a basic or necessary need, have an interesting architectural design, or are in need of a visual representation to help clarify their interior structure. These buildings in turn act as anchor sites that are preferably evenly located throughout the entire virtual city model. In this manner, these actual buildings represent a full spectrum of the city and cause a flow of exploration throughout the area surrounding the anchor building and thereby encourage end users to access the entire virtual city model. After several of the major buildings in these various categories are defined and located, a selection process begins. The number selected depends on how many building interiors can be completed in the project time frame and which customers or clients will ultimately participate in the virtual city model.

However, it should be appreciated that the interiors of all buildings or points or interested could preferably be photographed in alternative embodiments. Three-dimensional models of the buildings interiors selected to be photographed are subsequently created as illustrated by block 52. Digital photographs, panoramic views, videos, and basic measurements are used in this embodiment for the purpose of creating the object interiors.

Block 54 illustrates that interior navigation schemes are then programmed for the interior three-dimensional models that have been created. Programming navigation schemes includes outlining navigation boundaries, setting up teleporting zones and defining automatic navigation routes such as virtual tours.

Active objects are then defined and their behavior is programmed as illustrated by block 56. Active objects generally react to user input, such as a mouse click, or an external event, such as timer events and signals from other objects. Some objects may include artificial intelligence function and control the behavior of other objects.

After defining and programming the active objects, joining bar 58 illustrates that all three of the action branches 32, 34 and 36 are joined or merged. Before proceeding with the description of the merging the three action branches 32, 34 and 36, the second action branch 34 and the third action branch 36 will be described in further detail.

Under the second action branch 34, block 60 illustrates that ground photography of object exteriors within the target city area is performed. It should also be appreciated that photographing object exteriors includes photographing city objects and inhabitants which include vehicles such as boats, helicopters, planes, trains and automobiles; as well as lampposts, mailboxes, bridges, traffic lights, utility poles, wires, dumpsters and trash cans; and other similar objects which can be found in a city. Inhabitants include but are not limited to people, animals, other wildlife, and plants such as trees, bushes, grass and other suitable kinds of foliage. Digital photographs, panoramic views, videos, and basic measurements are used in this embodiment for the purpose of creating the object exteriors.

Joining bar 62 illustrates that the second action branch 34 merges with the third action branch 36. Accordingly, the third action branch 36 will now be described.

Under the third action branch 36, block 64 illustrates that geographic data for the city target area is acquired. Dividing bar 66 illustrates that the acquired geographic data is preferably utilized in a number of subsequent functions. For instance, block 68 illustrates that the acquired geographic data is used to create low-polygonal wire-frame object models. In addition, data object box 70 indicates that three-dimensional geometry is added to the city technology database.

The joining bar 62 indicates that the low-polygonal wire-frame object models are then combined with the ground photography. As a result, high-polygonal detail is added to the wire-frame object models as illustrated by block 72. In addition, data object box 70 indicates that further three-dimensional geometry is added to the city technology database.

Block 74 illustrates that graphic textures are created for the wire-frame models. Three-dimensional graphics are then added to the city technology database as indicated by data object box 76. The resulting three-dimensional models and data are then preferably merged with the results of the remaining functions of the third action branch 36 as indicated by joining bar 78.

Block 80 illustrates that the acquired geographic data is also preferably used to create three-dimensional models of the target area landscape. Thus, data object box 82 indicates that the city layout is created in the city technology database.

Again, the joining bar 78 indicates that the resulting three-dimensional model of the target area landscape is combined or merged with the wire-frame object models and related three-dimensional models and data. As a result, block 84 illustrates that the three-dimensional object models are integrated into the city model. The three-dimensional terrain for the city model is therefore completed as indicated by data object box 86.

Completing the three-dimensional terrain for the city model enables the navigation scheme for the city model to be programmed as illustrated by block 88. As described above, programming the navigation scheme includes outlining navigation boundaries, setting up teleporting zones and defining automatic navigation routes such as virtual tours. Block 90 illustrates that active objects are then defined for the city model and their behavior is programmed. Again, active objects react to user input, such as a mouse click, or an external event, such as timer events and signals from other objects. In addition, some objects may include artificial intelligence function and control the behavior of other objects.

The joining bar 58 indicates that the three-dimensional city model information and data created and compiled under the second and third action branches 34 and 36 is then preferably merged with the building interior information and data created and compiled under a portion of the first action branch 32. Merging this information and data enables the building interior virtual reality models to be integrated with the virtual reality city model as illustrated by block 92. Data object box 94 illustrates that the virtual reality model is then preferably completed in the city technology database.

The joining bar 48 illustrates that the completed virtual reality model is then combined with the integrated customer information from a final portion of the first action branch 32. Block 95 illustrates the binding of city elements and objects to underlying city technology database information. Binding the city elements and objects to the underlying city technology database information enables access to city technology database records. For instance, binding would be performed for an active object (e.g., a sculpture) in the city model where a piece of information (e.g., a description of the sculpture) is to be displayed in response to a mouse click on the active object. Data object box 96 illustrates the virtual city is now preferably completed.

The run-time model of the virtual city is generated from the city technology database as illustrated by block 97. Data object box 98 illustrates that the virtual city software package including the three-dimensional virtual city model is produced from the run-time model of the virtual city. Block 99 illustrates that the method for creating the virtual city model has ended.

The completed software package created by the above-described method of this embodiment is preferably distributed to end users. However, it should be appreciated that in alternative embodiments, the software package can be continually updated and distributed. Thus, changes can continually be made to the software package and the virtual city model in order to reflect changes in the corresponding real-world city. In addition, additional city elements can be added, updated and modified in the virtual city model. In this manner, the virtual city model and the underlying city technology database represent a dynamic and ever changing three-dimensional model of a real-world city.

Navigating the Virtual Three-Dimensional Environment

The virtual three-dimensional environment in this embodiment is a virtual three-dimensional model of a city, as described in the previous embodiment. However, just as with the previous embodiment, it should be appreciated that in alternative embodiments, the virtual three-dimensional environment could be any suitable environment or geographic location such as those described in the above embodiment.

In this embodiment, the virtual three-dimensional city model is displayed on a display and a user navigates the virtual three-dimensional city model and its associated interface using input devices such as a mouse, a keyboard, a touchscreen, voice-command or the like. The user navigates the city model for any suitable reason including to virtually explore and discover the city as well as to access defined city and business elements.

Figure 3A:
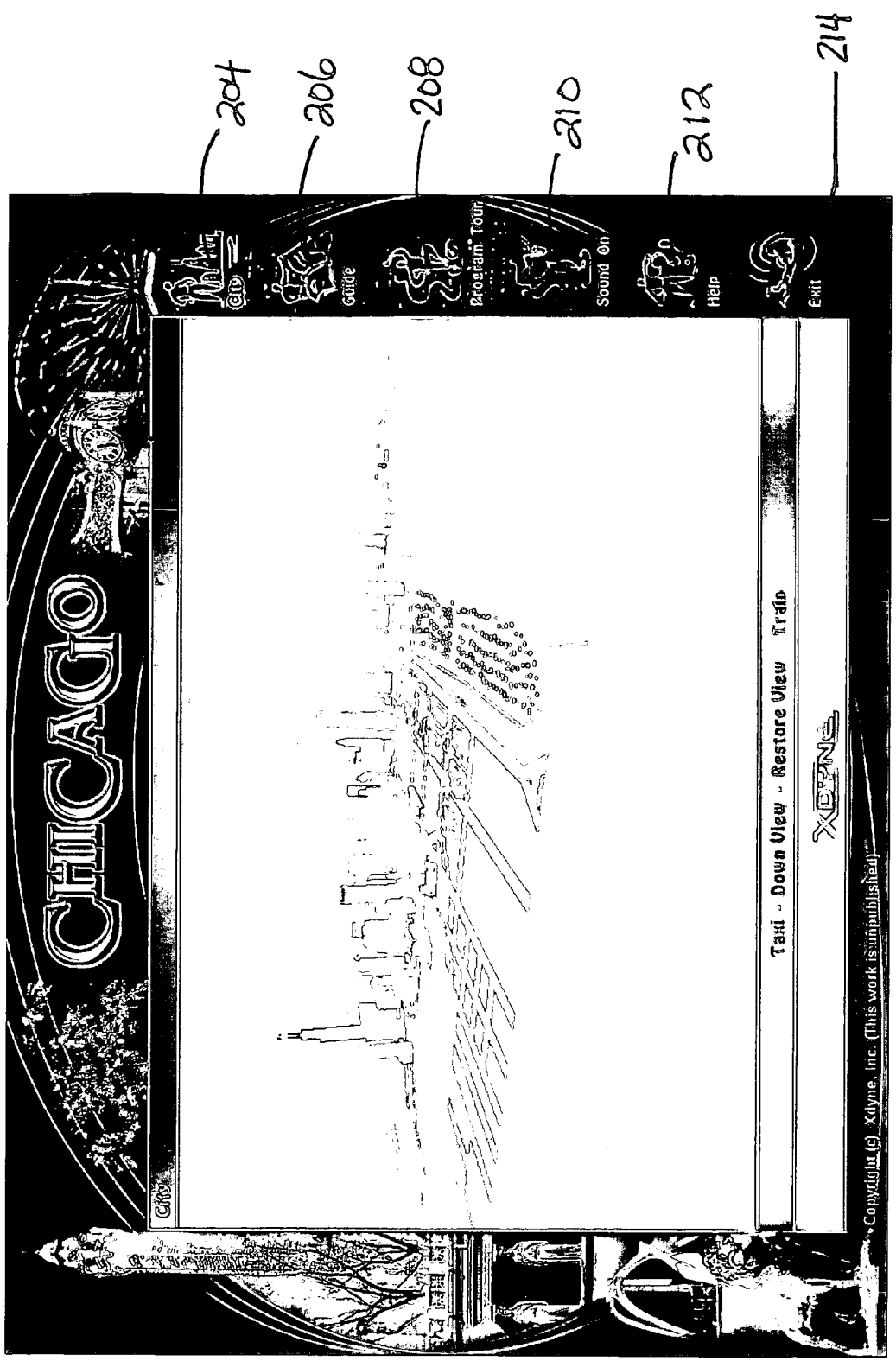

Referring now to FIG. 3A, an interface window 200 for the virtual three-dimensional environment of this embodiment is illustrated. In this embodiment, the interface window 200 includes an inner window 202 which currently displays an incomplete example of the virtual city model of one embodiment of the present invention. To access and/or activate the inner window 202 in a city mode, the user activates or presses the city input or button 204. Alternatively, the user could activate the inner window 202 by clicking inside the inner window 202. Once the inner window 202 is activated in the city mode, the user is able to navigate throughout the virtual city model.

In addition to or instead of navigating throughout the virtual city model, the user may want to obtain further information about the virtual city model. In this embodiment, the user can access a city guide by activating or pressing the guide input or button 206. The city guide is also displayed in the inner window 202 and includes information relating to the defined city and business elements within the virtual city model. The city guide will be discussed in greater detail below. If desired, the user may also activate a demonstration feature by activating or pressing the program tour input or button 208. Upon activating or pressing the program tour input or button 208, the user is guided through a brief tour of the virtual city model.

In this embodiment, the virtual city model includes audio features such as sounds effects and musical accompaniment designed to enrich the user's experience. The audio features for virtual city model can be toggled on and off by activating or pressing the sound input or button 210. If the user has any questions about the virtual city model, assistance can be requested by activating or pressing the help input or button 212. In addition, if the user is finished exploring the virtual city model, the user can exit the virtual city model by activating or pressing the exit input or button 214.

Figure 3B:
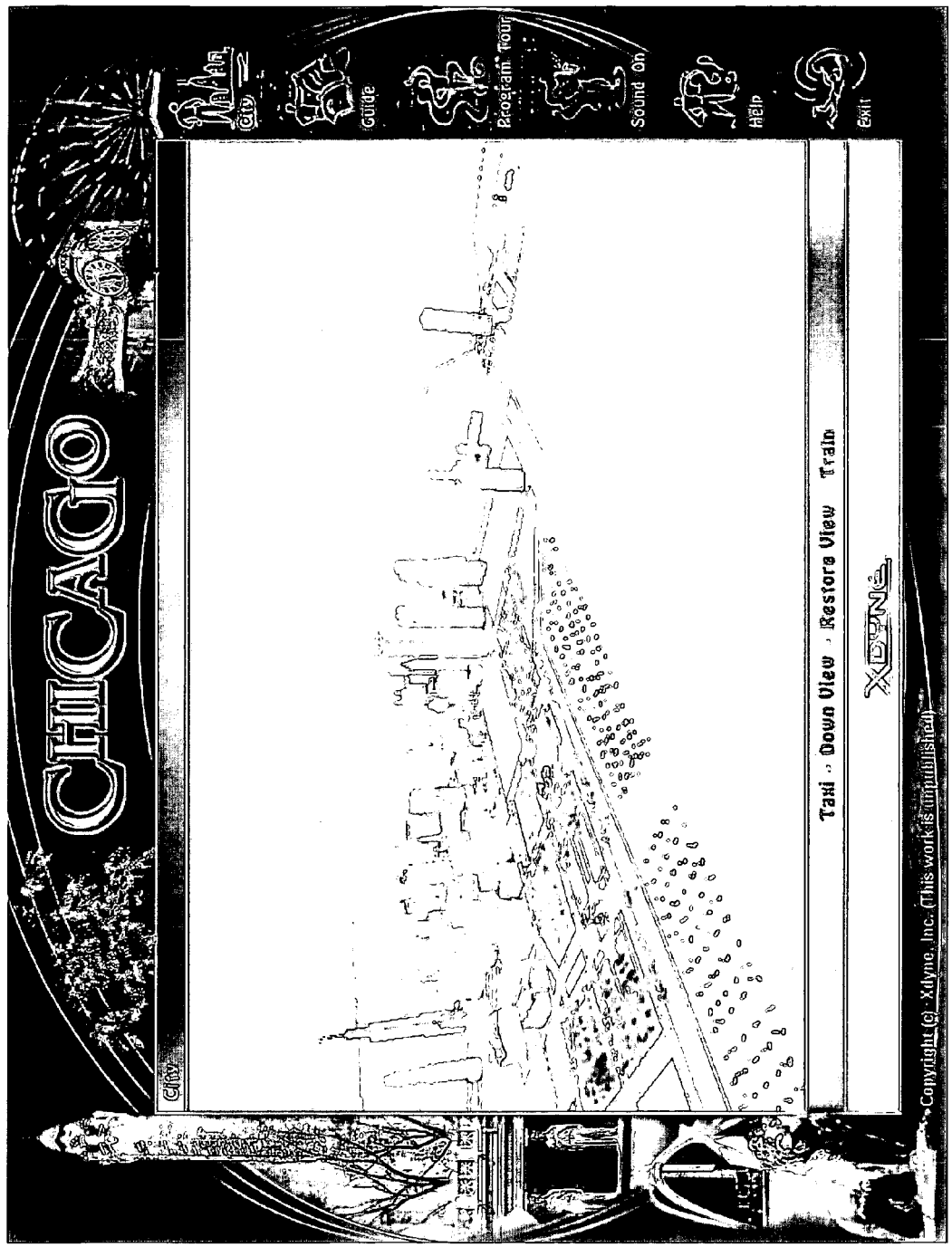
Figure 3C:
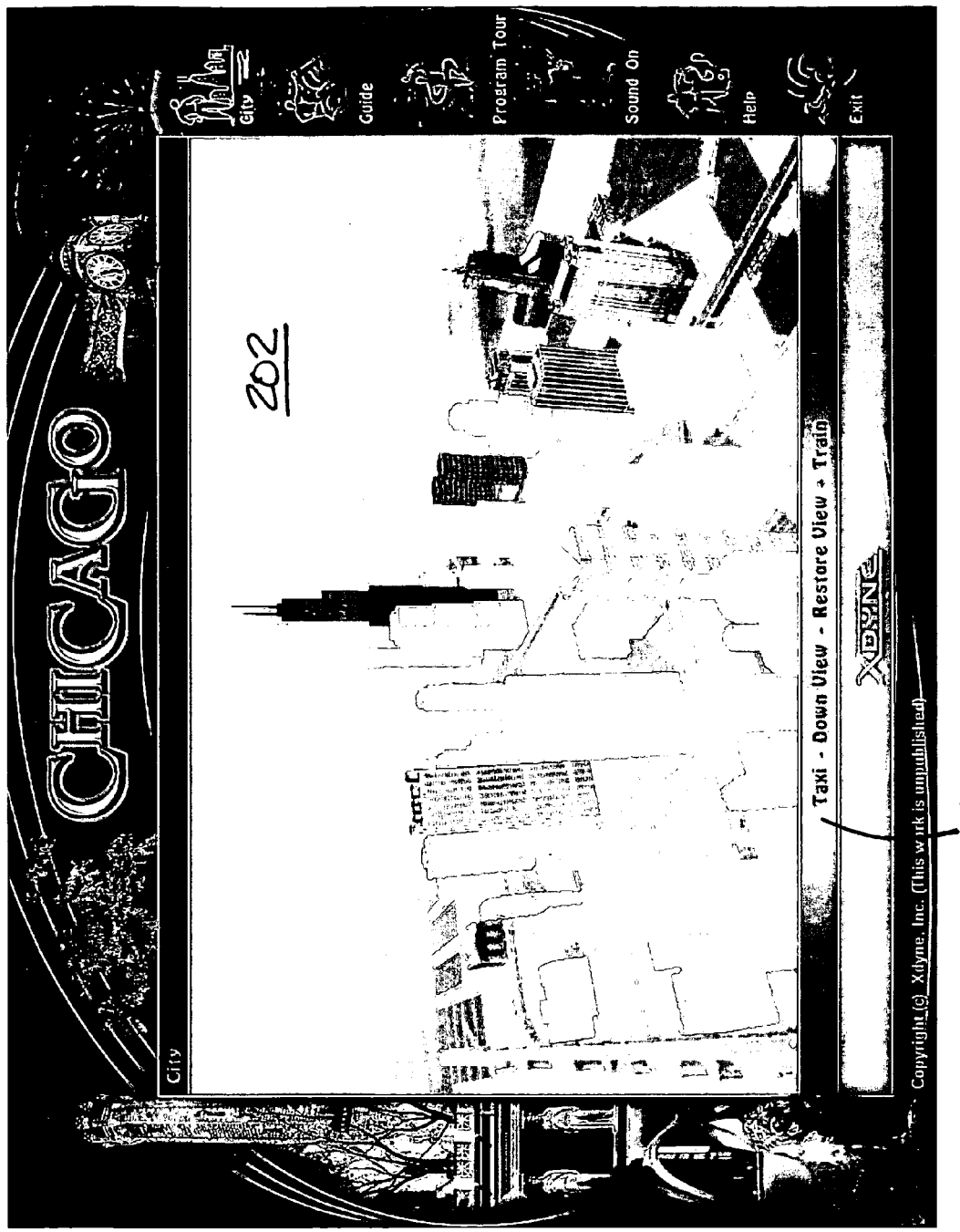

As described above, the user has the ability to freely navigate throughout the virtual city model. Any suitable navigation tool may be employed in the present invention. Referring now to FIG. 3B, it is noted that the user has zoomed in on the city model and is now examining the details of the virtual city model from a shorter distance. FIG. 3C illustrates a further view of the virtual city model accessible via the user navigation ability.

In FIG. 3C, just as in FIGS. 3A and 3B, the viewing angle afforded to the user may be described as a perspective or angle view of the virtual city model. However, it should be appreciated that alternative viewing angles of the virtual city model may be available to the user in accordance with the present invention. In this embodiment, the user can change the viewing angle to a top or down view of the virtual city model by activating or pressing the down view input or button 216, or by double clicking the right mouse input or button in the city window 202.

Figure 3D:
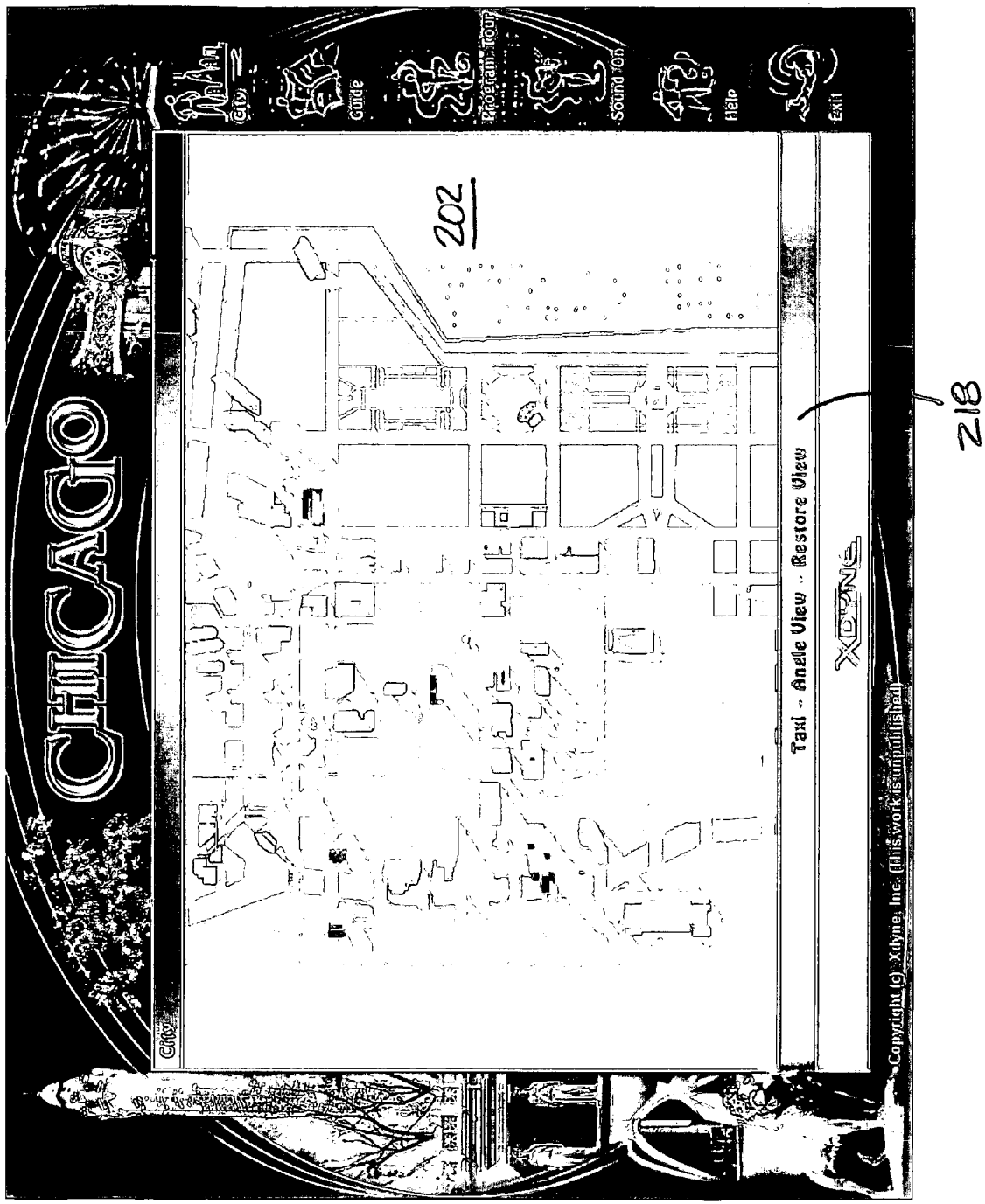

The down view of the virtual city model is illustrated by FIG. 3D. Just as with the perspective viewing angle of FIGS. 3A to 3B, the user is able to freely navigate the virtual city model while the viewing angle is in the down view illustrated by FIG. 3D. Thus, the virtual city model enables a user to virtually experience and become accustomed with the city from a number of different viewing angles. This provides one advantage which is to facilitate a user becoming familiar with a city. To return to the perspective viewing angle, the user activates or presses the angle view input or button 218.

In addition to the above-described viewing angles, this embodiment of the virtual city model includes two additional viewing angles. In this embodiment, the user activates a car view as illustrated in FIG. 3E by activating or pressing the letter 'C' on an attached keyboard. Here, the user is able to view the virtual city model as if they were riding in an automobile through the city. Alternatively, the user may view the city from a train view by activating or pressing the train input or button 220. The train view of the virtual city model is illustrated in FIG. 3F. To exit the train view and return to angle view, the user activates or presses the rise input or button 222.

This embodiment includes four distinct viewing angles. However, it should be appreciated that in alternative embodiments, a plurality of suitable views of the virtual city model may be available including, for example, a helicopter view, a boat view, an observation deck view, a pedestrian view, and a user-defined view.

While navigating the virtual environment, the user may encounter or desire to see a defined city element that the user would like to explore further. In this embodiment, the user is able to right click on the defined city element to request further information pertaining to the defined city element. Additionally, the user may double right click on the defined city element to obtain detailed information pertaining to the defined city element.

Figure 3G:
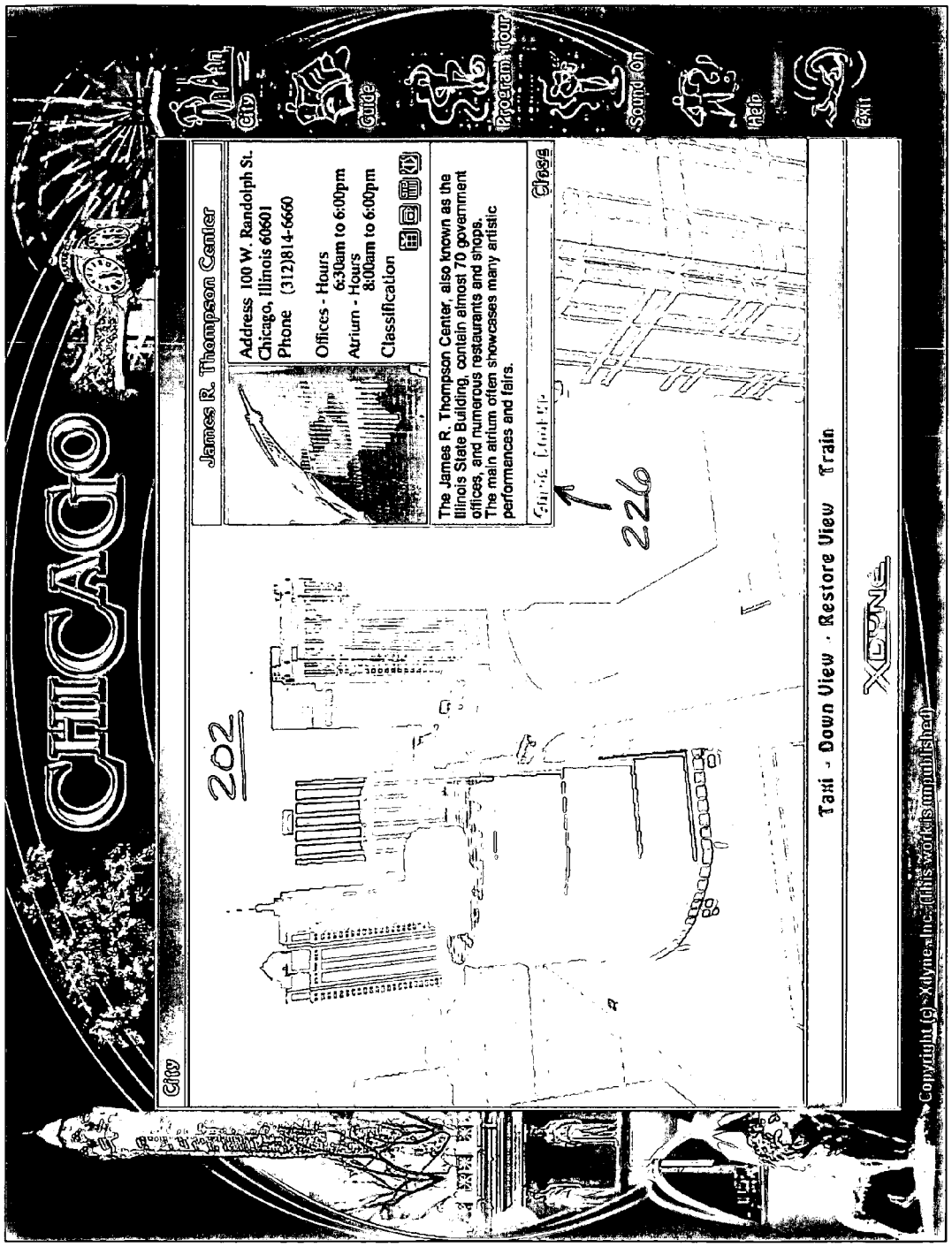

Referring now to FIG. 3G, the user has navigated to a James R. Thompson Center 224 in the city of Chicago, which is a defined city element in this embodiment. When the user right clicks on the James R. Thompson Center 224, an information window 226 is activated. The information window 226 displays information pertaining to the defined city element with which it is associated. In this embodiment, the information window 226 is associated with the James R. Thompson Center 224 and displays information pertaining to same including an address, a phone number, hours of operation and a description.

In this embodiment, the information window 226 provides the user with general information pertaining to the associated city element. However, it should be appreciated that in alternative embodiments, the information window 226 could display more or less information pertaining to the defined city element with which it is associated depending upon the level of detail required by the intended user.

Figure 3H:
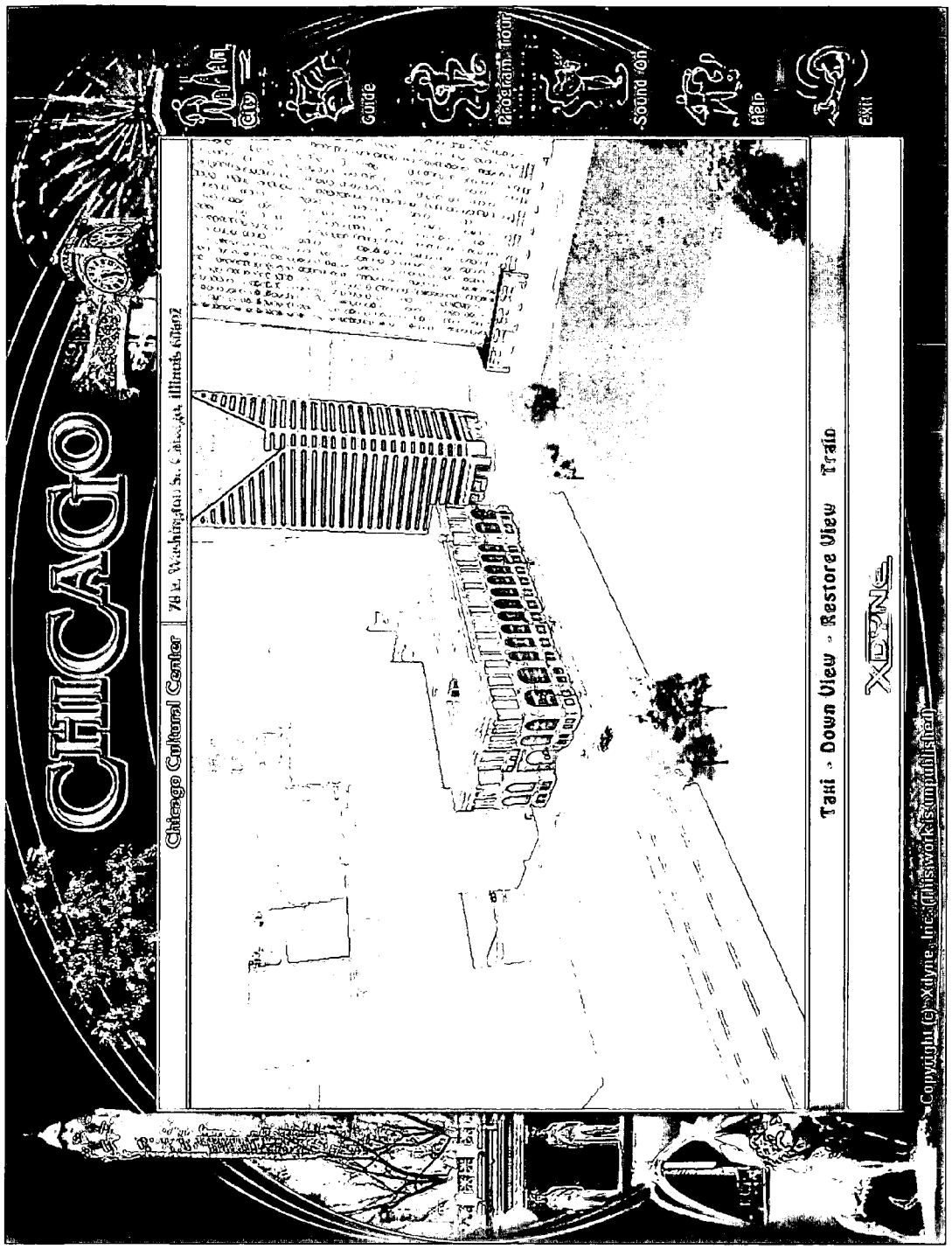
Figure 3I:
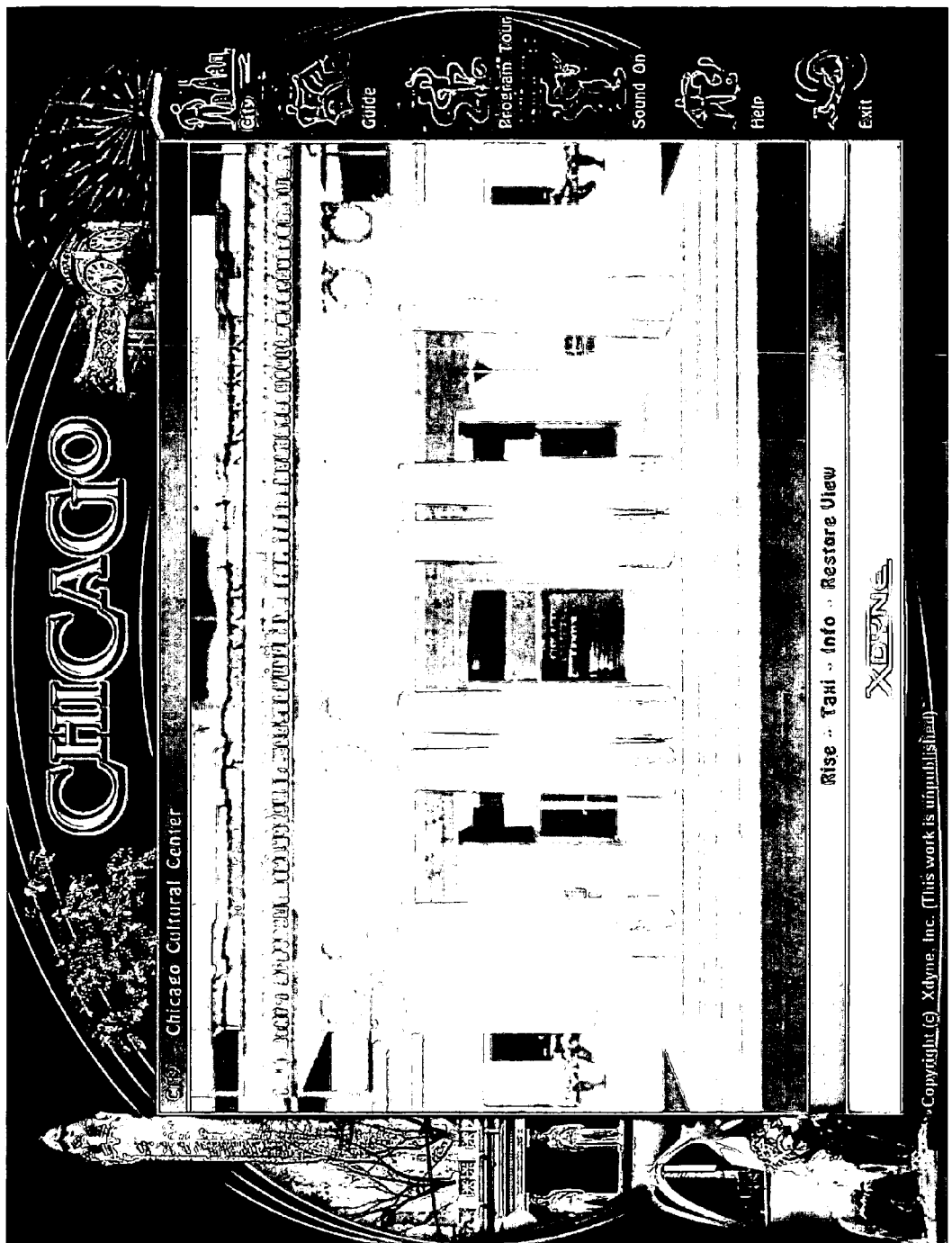
Figure 3J:
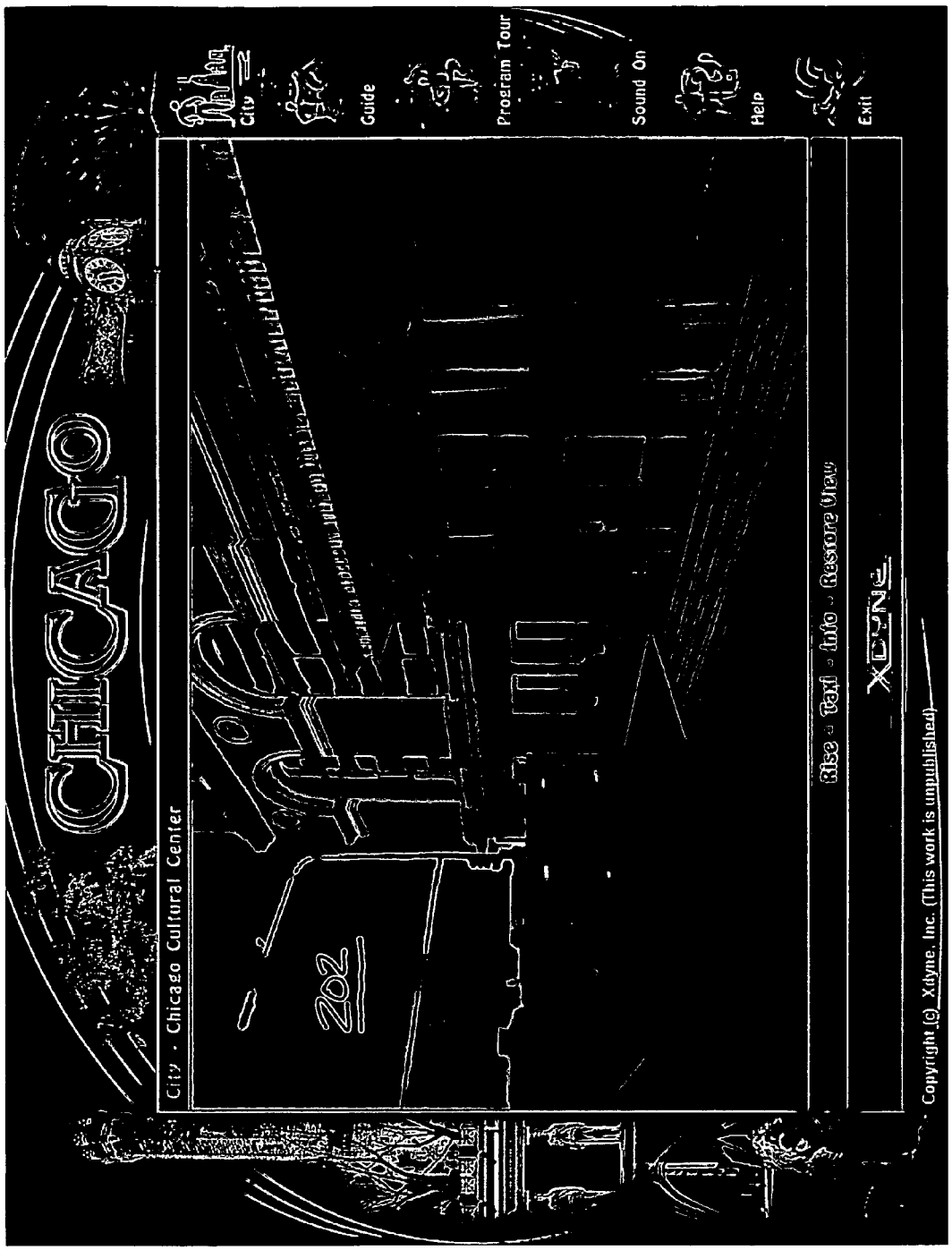

Referring now to FIG. 3H, the user has navigated to a Chicago Cultural Center 228, which is a defined city element in this embodiment, as indicated by location bar 230. When the user double right clicks on the Chicago Cultural Center 228, the inner window 202 presents the user with a street level view of the Chicago Cultural Center as illustrated by FIG. 3I. From the street level view, the user is still able to navigate and explore their surroundings. For instance, the user can look to their left in the inner window 202 as illustrated by FIG. 3J. Thus, at each active or defined city element, the user can view surrounding structures in the city to become familiar with the area of the city around the defined city element.

Referring now to FIG. 3K, the user has pressed the taxi input or button 232 and is presented with a list of available locations as indicated by taxi window 234. In this embodiment, the available locations correspond to defined city elements within the virtual city model. Thus, the user can go to a Navy Pier 236 by clicking same within the taxi window 234. In this embodiment, only one defined city element is listed in taxi window 234. However, it should be appreciated that any suitable number of defined city elements may be listed in taxi window 234 in alternative embodiments.

Figure 3L:
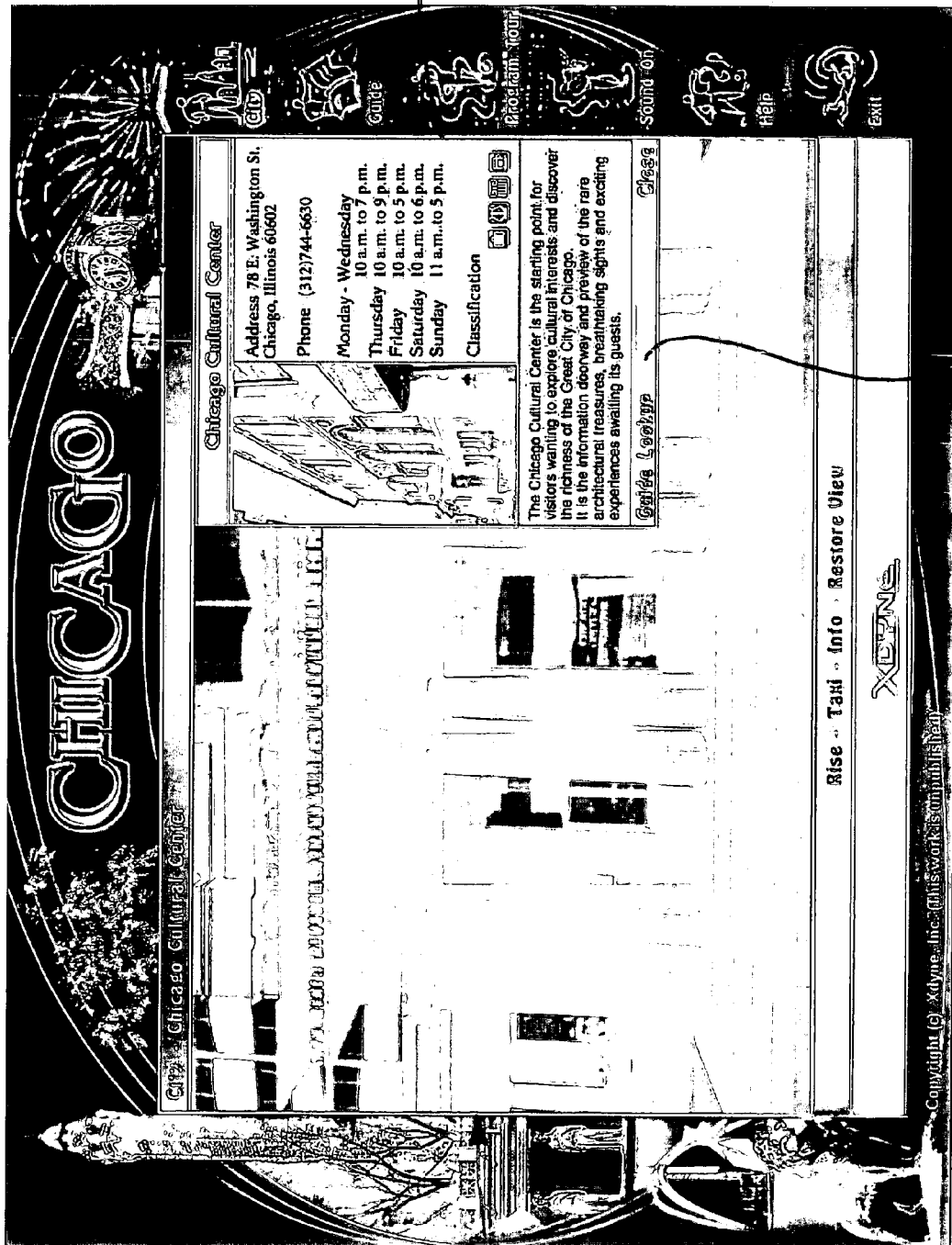

Referring now to FIG. 3L, the user has pressed the info input or button 238 and the information window 226 for the Chicago Cultural Center is displayed. As previously described, the information window 226 in this embodiment includes displays information pertaining to defined city element including an address, a phone number, hours of operation and a description. In addition, the information window includes the guide lookup input or button 240.

Figure 3M:
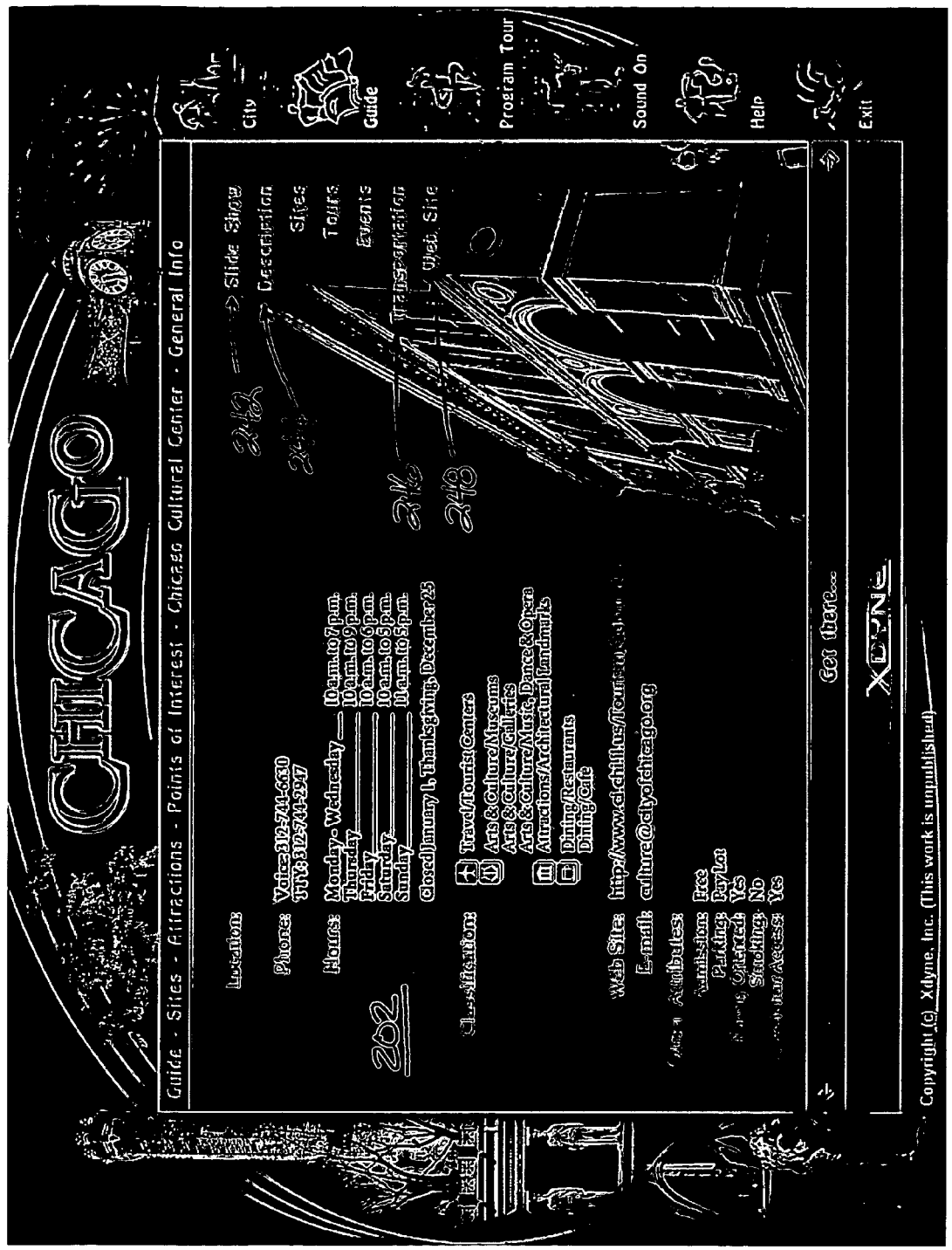

By activating or pressing the guide lookup input or button 240, the user causes the inner window 202 to display the associated guide information for the defined city element as indicated by FIG. 3M. The guide information includes detailed information pertaining to the defined city element. In addition, it includes links to further information concerning the defined city element.

For instance, by activating or pressing the slide show input or button 242, the user can view a slide show of the defined city element. A detailed description of the defined city element can be viewed by activating or pressing the description input or button 244 while transportation information related to the defined city element can be viewed by activating or pressing the transportation input or button 246. In addition, the user can view the website for the defined business or city element by activating or pressing the website input or button 238.

It should appreciated that links to any suitable source of information pertaining to the defined city element can be included in the guide information displayed in inner window 202. For example, the guide information may include videos, detailed tours, products, services or other features pertaining to the defined city element in accordance with the present invention. In this manner, the guide information enables the user to explore and become familiar with the defined city element and its surroundings.

In addition to the above-described features, the virtual city model of this embodiment includes a number of features that relate to environmental aspects within the virtual city model. For instance, the virtual city model may include conventional artificial intelligence for simulating vehicles, signs, signals and the like within the virtual city model. In addition, weather conditions, seasons and time can be simulated within the virtual city model. For example, conditions in the virtual city might get darker to simulate the transition from day into night.

All of the above-described environmental aspects of the virtual city model can be preprogrammed or may be obtained and influenced through the Internet. For instance, the actual time in the real-world city could be obtained through the Internet and used to influence the simulated time in the virtual city. Similarly, the actual weather conditions in the real-world city could be obtained through the Internet and used to influence the weather conditions in the virtual city. In addition, the environmental aspects could also be user-selectable. In this manner, the user is able to experience varying environmental conditions in the virtual city in order to become more familiar with how the real-world city might be presented in the given environmental conditions.

It should thus be appreciated that various embodiments of the present invention can provide a plurality of different view of the city. For instance, the views of the city can include riding or driving through the city, flying through the city, walking through the city, jumping between different related or unrelated city elements and city element identification. It should be appreciated that the other views of the city could be provided in accordance with the present invention.

Methods of Generating Revenue Based on the Virtual Three-Dimensional Environment The virtual three-dimensional environment described in the above embodiments presents a user with a versatile tool for virtually discovering and exploring a real-world environment without the associated time, risks and costs involved in actually exploring the real-world environment. It should be appreciated that this versatile tool, that is, the virtual three-dimensional environment, can be used to generate revenue in a number of ways. Suitable uses for the virtual three-dimensional environment and corresponding methods for generating revenue therefrom will be described below.

At the outset, the virtual three-dimensional environment can be used a an economic development tool. The virtual three-dimensional environment provides a comprehensive visual representation of an existing or non-existing building with a comparative surrounding dynamic and static data which can be used for redevelopment of residential areas and sales and investment in business. It should be appreciated that one intended use of the virtual three-dimensional environment as an economic development tool would be in business relocation. Businesses or organizations can simulate an intended or proposed business location without actually developing the business location beforehand. In addition, the virtual three-dimensional environment could also be used for zoning purposes. Thus, a proposed building or similar structure could be simulated in a given location before a zoning decision is made in the real-world.

In addition, the virtual three-dimensional environment in the form of a virtual city could serve as an Internet portal. In this manner, the virtual city would serve as an entry point to a number of websites corresponding to defined city elements within the virtual city. In addition, the interface for the virtual city could provide access to a search engine for locating additional web resources within or outside of the virtual city.

Another use of the virtual three-dimensional environment could be for market research purposes. Data collected from end-users of the virtual three-dimensional environment could be used to compile market research statistics. Market research statistics could be compiled by monitoring and analyzing the end-user's interaction or behavior within the virtual three-dimensional environment. In addition, demographic information could be collected from the end-users to enhance the market research statistics. Demographic information could include many factors relating to the end-users including, for example, their address, zip code, phone number, salary, marital status, gender, profession, ethnic background, homeowner status, age, and education level.

One additional suitable use of the virtual three dimensional environment is for business and/or organization promotion. Specifically, defined city and business elements within a virtual city model serve to promote a corresponding business or organization. In turn, money is collected from these businesses and organizations in order to have their interest represented as a defined city element in the virtual city model.

Although a number of suitable uses are described herein, it should be appreciated that there are a plurality of suitable commercial uses for generating revenue using the virtual three-dimensional environment of the present invention.

Figure 4:
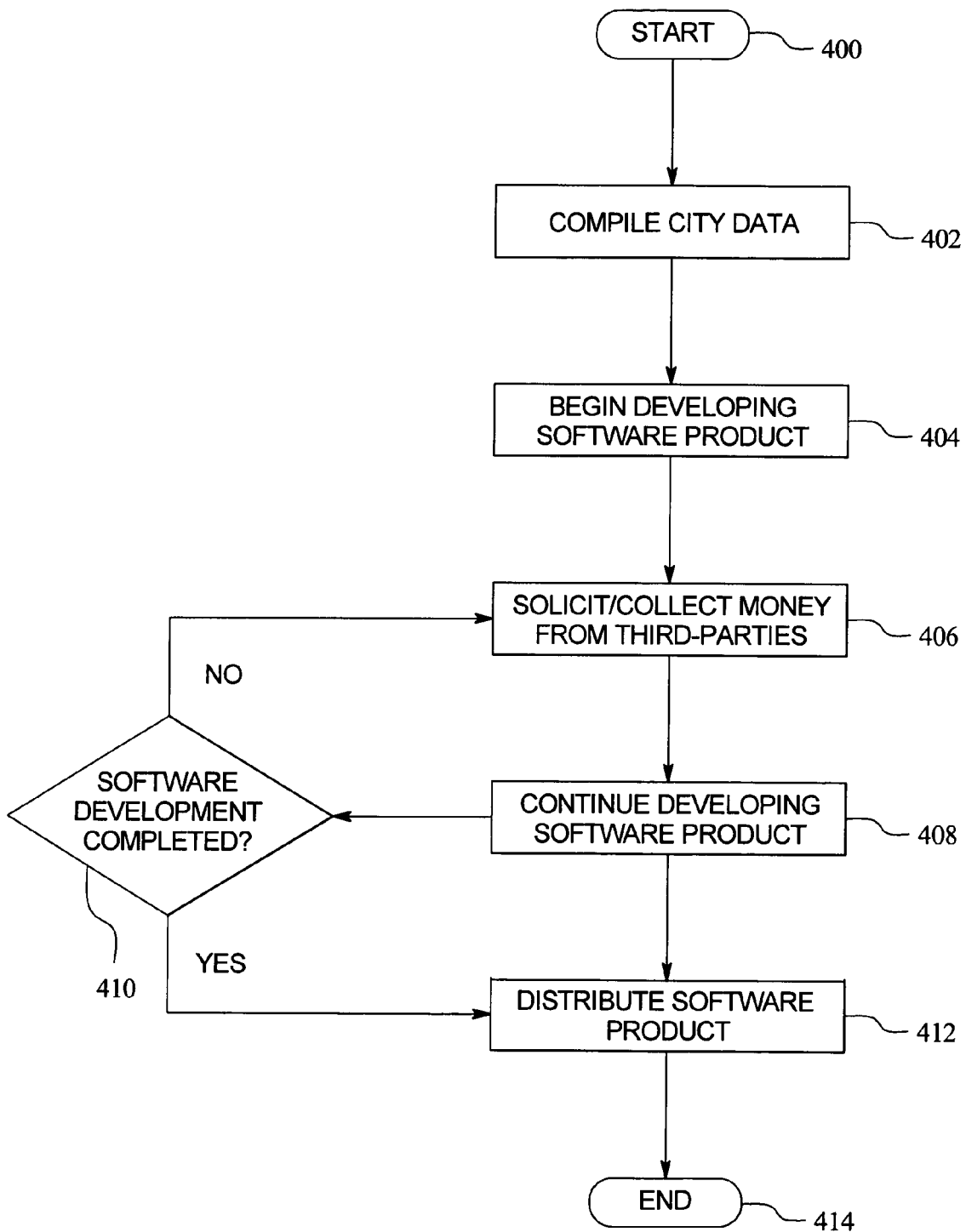
FIG. 4 is a flowchart illustrating one embodiment of a method for generating revenue of the present invention.

Referring now to FIG. 4, a method for building a software product to generate revenue is illustrated. The method starts at block 400 and continues to block 402 where city data is compiled. The city data in this embodiment includes information relating to city business and tourist information as well as to city geographical information. City data can be collected and compiled using any suitable technique. One suitable technique is described above in greater detail in the embodiment for creating the virtual reality three-dimensional environment.

After the city data has been compiled, development of the software product begins as indicated by block 404. The software product in this embodiment includes a virtual three-dimensional model of a city and is created using the compiled city data. The creation of the three-dimensional model of the city to be used in the software product can be accomplished using any suitable technique. One suitable technique is described above in the embodiment for creating the virtual reality three-dimensional environment.

After development of the software product has begun, money is solicited and/or collected from third-parties as indicated by block 406. The third-parties include any suitable party that has a realizable interest in the software product, particularly the virtual city model. For instance, a retail business located within the inner boundaries and desiring to promote awareness of its business by enabling access to its business and related information in the virtual city model would be one suitable third-party. Additionally, a sports franchise desiring to promote its products, facilities and talent in the virtual city model would be another suitable third-party. It should be appreciated that there are a plurality of suitable third-parties that have business and/or promotional interests that can be represented using the virtual city model of this embodiment.

After money is solicited and/or collected from the third-parties, development of the software product continues as indicated by block 408. Then, a determination is made as indicated at decision diamond 410 as to whether software development is completed. Money is once again solicited and collected from suitable third-parties as illustrated by the block 406 if software development is not completed. Thus, development of the software product is ongoing while money is continuously solicited and collected from interested third-parties. The money collected from third-parties can therefore be used to fund the development of the software product and to generate revenue.

It should be appreciated that the addition of initial third-parties to the virtual city model will make the end product more attractive to additional third-parties. For instance, attracting a recognizable anchor tenant or business for the virtual city model would attract other companies to be a part of the virtual city model. It should also be appreciated that the money charged to third-parties may reflect the level of involvement and interaction the third-party desires within the virtual city model. In-depth interaction and involvement will require a more significant monetary investment on the part of the third-party while a lesser role in the virtual city model will not require as significant of a monetary investment.

For example, in this embodiment, there are three participation levels or packages available to third-party investors. The first package is a basic package and it includes basic information or passport data pertaining to the third party such as the name, address, phone number, facsimile number, a picture or logo of the third party, and an integrated electronic mail and website. The approximate price for the basic package is about three thousand dollars and that price includes twenty five copies of finished software product for the third-party to distribute.

In this example, the second package is an advanced package and it includes extended passport data. Extended passport data includes the basic passport data listed above and integrated electronic mail and website as well as multimedia content that is provided by the third-party. The approximate price for the advanced package is about eight thousand dollars and that price includes one hundred copies of finished software product for the third-party to distribute.

The third and final package in this example is an elite package and it includes all of the same information as the advanced package in addition to a custom interactive virtual reality environment including building interior modeling.

The approximate price for the elite package is about thirty thousand dollars. In one embodiment additional costs will be incurred for additional development of the package. The elite package includes one thousand finished copies of the software product for the third-party to distribute.

When it is determined at decision diamond 410 that the software product has been completed, then the software product is distributed as indicated by block 412. The software product is distributed to any suitable party. For instance, consumers will be a likely target for distribution because they will be the largest audience for retail and commercial businesses as well as sports franchises, tourist attractions, and the like.

Another suitable party includes travel agents and the like because they will be better able to make informed decisions for clients regarding lodging, dining, shopping and the like based on their experience with the virtual city model. One other suitable party includes convention attendees who will be visiting the real-world city and might require information related to lodging, dining, entertainment, shopping and the like. Another suitable party includes real estate agents who could use the virtual city model in sales programs to sell city property and banks, businesses and trade offices to increase trade and revenues. It should be appreciated that the suitable parties for distribution is a very large pool and will be greatly influenced by the third-parties that invest in the virtual city model.

In this embodiment, a limited number of copies of the software product are given to the third-parties as part of their initial investment. Additional copies of the software product can be purchased, thereby generating additional revenue. In addition, the creator of the software product is able to sell copies of the software product to interested parties in an effort to generate additional revenue. The third-parties are able to distribute their copies as they desire. The method subsequently ends as indicated by block 414.

In this embodiment, the software product is completed and subsequently distributed and the method ends thereafter. It should be appreciated that in alternative embodiments, development of the software is a dynamic and ongoing process. Thus, the software product is temporarily completed and distributed. That is, a run-time version of the software product is created and distributed, but development of the software continues. Further money is collected and solicited from third-parties, thereby generating further revenue. In this fashion, a plurality of updated run-time versions can be created and distributed while development of the software continues.

Figure 5:
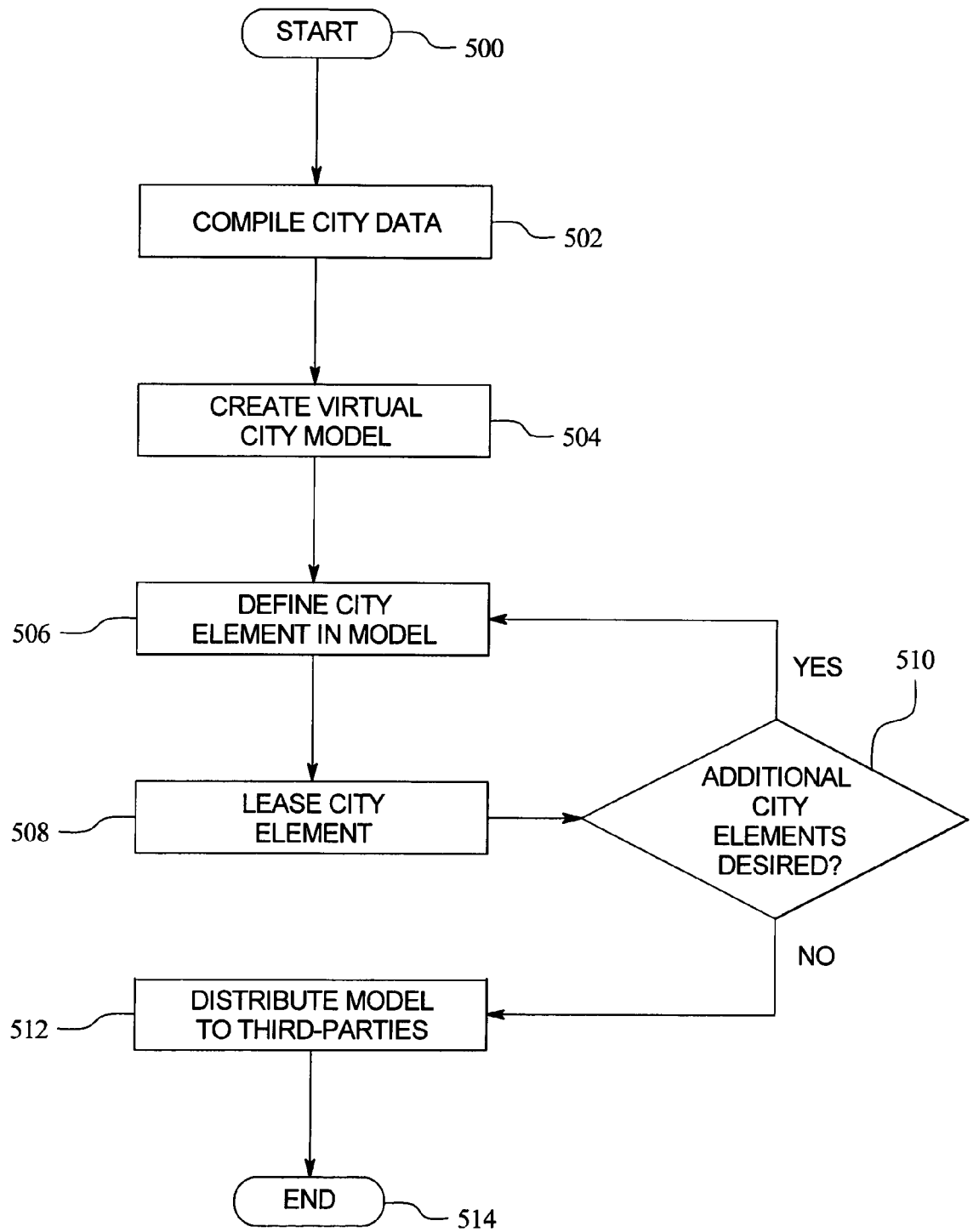
FIG. 5 is a flowchart illustrating another embodiment of a method for generating revenue of the present invention.

Referring now to FIG. 5, one other method for generating revenue is illustrated. The method begins at block 500 and continues to block 502 where city data is compiled. As described above, the city data in this embodiment includes information relating to city business and tourist information as well as to city geographical information, and can be collected and compiled using any suitable technique. One suitable technique is described above in greater detail in the embodiment for creating the virtual reality three-dimensional environment.

After the city data has been compiled, a virtual three-dimensional city model is created as indicated by block 504. The creation of the virtual city model in this embodiment is accomplished according to the process described above in the embodiment for creating the virtual reality three-dimensional environment.

Once the virtual city model is created, a city element is defined in the virtual city model as indicated by block 506. It should be appreciated that a defined city element can be any suitable element within the city as described above. The city element is then leased to a corresponding real-world party as indicated by block 508.

Generally, even though not required, the corresponding real-world party as the lessee will have some affiliation with the leased city element. For instance, where the defined city element to be leased is a hotel, the lessee could be the hotel owner. Alternatively, it should be appreciated that the lessee of the hotel could also be the franchiser where the hotel is part of a larger franchise.

It is determined at decision diamond 510 whether additional city elements are desired. If additional city elements are desired, then an additional city element is defined as indicated by block 506. The newly defined city element is then leased as indicated by block 508. In this fashion, a plurality of city elements can be defined and leased, thereby generating revenue for the lessor.

When it is determined at decision diamond 510 that no additional business elements are desired, then the virtual city model is distributed the third-parties as indicated by block 512. The virtual city model in this embodiment is distributed to any suitable third-party. As described above, consumers will be a likely target for distribution because they will be the largest audience for lessees within the virtual city model such as retail and commercial businesses as well as sports franchises, tourist attractions, and the like.

Again, suitable third-parties for distribution would also include travel agents, convention attendees, business travelers and the like. Of course, it should be appreciated that the suitable third-parties for distribution includes a very large pool of possible parties that will be greatly influenced by the lessees in the virtual city model.

In this embodiment, a limited number of copies of the virtual city model are given to the lessees as part of their initial investment. Additional copies of the virtual city model can of course be purchased, thereby generating additional revenue. In addition, the creator of the virtual city model is able to sell copies of the model to interested parties in an effort to generate additional revenue. The lessees are able to distribute their copies as they see fit. The method subsequently ends as indicated by block 514.

In this embodiment, the virtual city model is completed and subsequently distributed and the method ends thereafter. It should be appreciated that in alternative embodiments, development of the virtual city model is a dynamic and ongoing process. Thus, copies of the virtual city model may be periodically distributed, but development of the virtual city model may continue. Further city elements are defined and leased, thereby generating further revenue. In this fashion, a plurality of updated copies of the virtual city model can be created and distributed while development of the software continues.

It should be appreciated that the virtual city model of the present invention can be stored and distributed via any suitable storage and/or distribution medium. For example, the virtual city model may be stored on optical storage such as compact discs (CDs) and digital versatile discs (DVDs). CDs and DVDs provide a convenient and inexpensive mode of mass storage and distribution. In addition, the virtual city model may be distributed over a network such as the Internet. Another example of a network is a broadband network such as a cable or satellite network. Alternatively, copies of the virtual city model could be distributed via CDs or DVDs and updates to the virtual city model could be obtained via the Internet. It should be appreciated that a software product containing the virtual city model may be distributed in the same fashion.

Based on the above described methods of generating revenue, it should be appreciated that the present invention serves to illustrate methods of generating revenue based on business promotion where the location of the business is physically illustrated in three-dimensions in a virtual city model in relation to a plurality of points of interest in the city within proximity to the location of the business. The business is preferably charged a sum of money in order to have its business so illustrated. In this embodiment, the proximity in the virtual city model can be either predetermined or defined by a user. The user is therefore able to virtually explore the business in relation to other businesses within a proximity to the business. This also enables the user to become familiar with the environmental surroundings of the business.

It should be appreciated that the methods of generating revenue are not limited to business promotion and can be applied to promotion of any element within the city including tourist attractions, transportation facilities, hospitals, universities and the like. It should also be appreciated that the methods of generating revenue are not limited to a virtual city model and can be applied to any virtual model of a suitable environment or geographic location.

Figure 6:
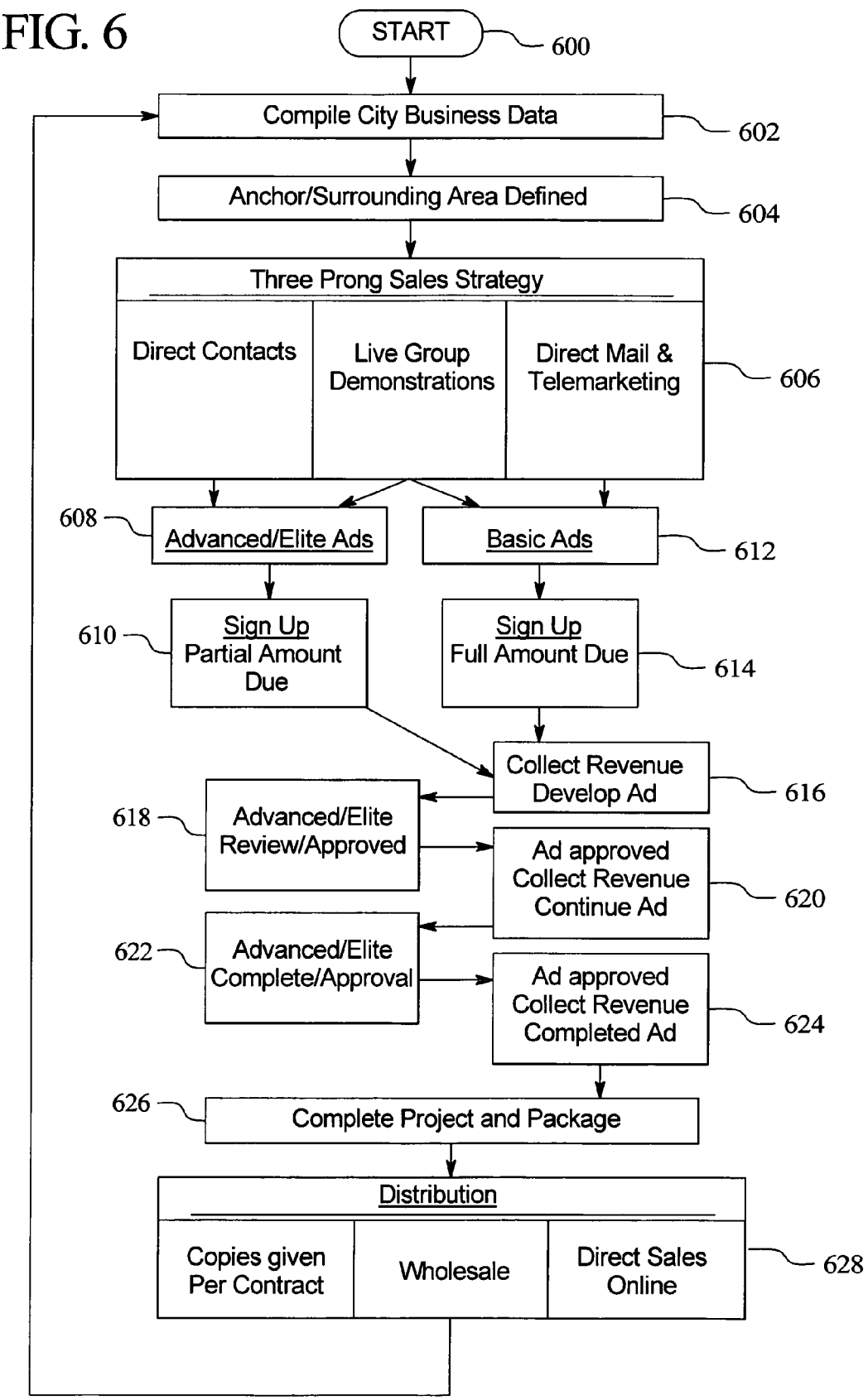
FIG. 6 is a flowchart illustrating one other embodiment of a method of the present invention for generating revenue by marketing a three-dimensional city model in a cyclical revenue stream.

Referring now to FIG. 6, one other method for generating revenue by marketing a three-dimensional city model in a cyclical revenue stream is illustrated. The method starts at block 600 and continues to block 602 where city business data is compiled. Compiling city business data according to this method includes compiling information relating to city businesses, tourism information, real estate and development plans, as well as city geographical information and the like. City business data can be collected and compiled using mailing lists, tourist guides, business magazines and newspapers or any other suitable information source. One suitable technique for compiling city business data is described above in greater detail in the embodiment for creating the virtual reality three-dimensional environment.

Once the city business data has been compiled, suitable anchor buildings and area businesses are located and chosen, and a surrounding area is defined as indicated by block 604. Major commercial buildings, attractions, office buildings, residential and commercial real estate, government buildings, transportation depots, universities, and hospitals are examples of sites that should be considered as anchor buildings. In general, anchor buildings serve a basic or necessary function, have an interesting architectural design, or are well suited for a visual representation that helps clarify the interior structure of the anchor building. The buildings act as anchor sites in that they are evenly located throughout the entire virtual city model.

Anchor building are chosen in order to represent a full spectrum of the city and to cause a flow of exploration throughout the area surrounding the anchor building, thereby encouraging the end user of the virtual city model to access the entire city model. After locating and defining several major buildings in various categories, a selection process begins whereby buildings are chosen such that the building interiors can be completed in a predetermined project time frame and according to parties who have indicated an interest in participating in the virtual city model. It should be appreciated that anchor building and sites can be located and chosen according to any suitable technique. One suitable technique is described above in greater detail in the embodiment for creating the virtual reality three-dimensional environment.

After defining anchor buildings and the corresponding surrounding area, a three prong sales strategy begins as illustrated by block 606. The three prong sales strategy includes three general sales approaches that serve to general advertising revenue. First, selected third party anchor buildings are contacted directly about advertising opportunities in the virtual city model. Second, live demonstrations of the virtual city model are presented to business and professional associations, chambers of commerce, city organizations and scheduled groups of interested parties in order to further generate advertising interest in the virtual city model. Finally, direct mail and telemarketing is used to contact third parties surrounding the anchor buildings in order to generate further interest in the virtual city model.

The three prong sales strategy described above with reference to block 606 generates interest in the virtual city model and enables parties who are interested in advertising via the virtual city model to consider two categories of advertising development. The first category of advertising development includes advanced and elite advertising packages as illustrated by block 608. Parties choosing the advanced or elite advertising packages generally originate from direct contact or from live group demonstrations.

Parties choosing an advanced or elite advertising package must sign up for the package as illustrated by block 610. Signing up an advanced or elite advertising package requires a deposit or a partial up-front amount and an approval process that includes two other partial payments. Generally, payments for an advanced or elite advertising package are accepted either in person or through the mail. However, it should be appreciated that any suitable form of payment will be accepted in alternative embodiments.

The second category of advertising development includes a basic advertising package as illustrated by block 612. Parties choosing the basic advertising packages generally originate from live group demonstrations or from direct mail and telemarketing. The basic advertising package includes a sign up process as indicated by block 614 which requires that the total amount for the basic advertising package is due once all of the party's information is submitted. Generally, the party signing up for the signs up online and submits information online including pictures and logos. The advertisement for the basic advertising package is automatically developed using an online program, and the party approve the finished advertisement and submits payment online. However, it should be appreciated that the basic advertising package can be modified in alternative embodiments to include other forms of advertising development and payment acceptance.

After the sign up process has been finished, revenue collection and advertising development begins as illustrated in block 616. It should be appreciated that basic advertising packages are generally completed automatically and revenue collection and advertising development will apply in general to advanced and elite advertising packages. Development and production of advanced and elite advertising packages begins once money is collected as illustrated by block 618 and are subject to review and initial approval by the party requesting the package. Once the party approves the initial advertising package, further revenue is collected and the development of the advertising package continues as indicated by block 620. The completed advanced and elite advertising package must be reviewed and approved by the party requesting the package as illustrated by block 622. After the party approves the completed advertising package, the final amount due under the advertising package is collected as indicated in block embodiment 624.

After a selected number of advertising packages have been completed, development of one version of the virtual model city is completed and packaged as indicated by block 626. Completion of the virtual city model is described above in greater detail in the embodiment for creating the virtual reality three-dimensional environment.

Block 628 indicates that distribution of one finished version of the virtual city model begins includes three distribution approaches. First, copies of the virtual city model are given to the basic, advanced, and elite third parties per their respective advertising development contract. The parties are free to distribute these copies as they see fit. Second, copies of the virtual city model are distributed wholesale to other third parties, specific industries and retail stores. Lastly, copies of the virtual city model are distributed via direct online sales.

After distribution of the finished version of the virtual city model is complete, block 102 illustrates that the method begins again. That is, the development cycle repeats and new third parties are added to the virtual city model and contracts are renewed with parties from the previous version of the virtual city model. Each cycle increases the information contained in the virtual city model, thereby enhancing the virtual city model and increasing the overall revenue stream. In this regard, it should be appreciated that interest in the virtual city model will increase over time and the revenue stream will therefore increase over time.

Public Domain Objects and their Representation

As indicated above, objects such as public domain objects in the virtual actual city of the present invention can be represented in many different manners. In one embodiment, the city database contains information about number of city objects, referred to s "objects in public domain". The database includes general non-commercial information about city physical structures, layout and transportation. The set of public domain objects includes, but is not limited to: (a) buildings (purely as architectural objects, i.e. not as places of business); (b) unique architectural objects (such as bridges, sculptures, fountains, etc.); (c) streets, squares/plazas, parks and beaches; and (d) train lines/stations, bus/trolley routes/stops, parking places, taxi stands, piers, etc. Such public domain objects descriptions do not need to contain any specific business-related data, such as business names and trademarks, telephone numbers, web & e-mail addresses, etc (except if the virtual actual 3-D city of the present invention is being used for city planning, zoning, etc. where the business-related data may be the governmental agency controlling or managing such object.) The publicly available information can be restricted to: (a) the unique (non-business) name (for example—"Navy Pier" or "Madison St."); (b) the generic (type) name (for example "Parking Lot" or "Bus Stop"); (c) the neighborhood location (for example, "The Loop" or "River North"); (d) the city address; and (e) the general short description. It should be appreciated that not all items from the above list are applicable to particular type of object. For example, parking places or bus stops may not have any description (if this was not specifically acquired by a business entity managing such object), and streets or unique architectural objects may not have an address.

In various embodiments of the present invention, certain additional information may also be provided for certain object types. For example, street information may include traffic direction, a list of buildings located on the street, and/or a list of intersecting streets. This may require introduction of additional information displays for certain object types, which will be accessible via bookmarks or "tabs" similar to standard bookmarks reserved for web and multimedia displays.

Similar to business objects, public domain objects can be represented in a city guide via sets of full-screen informational displays, though originally such displays may not contain as much information as commercial object displays. This will depend in part on the desired use of the virtual actual 3D city.

Alternative 3D Virtual Actual City/Environment Uses

As discussed above, it should be appreciated that the same 3D virtual actual city and database structure can produce several different streams of revenue. After the 3D virtual actual city is completed at least to a minimum level, the 3D virtual actual city can be modified and used for several diverse and compelling purposes. The following are distinct revenue-generating uses for the 3D virtual actual city of the present invention which meet individual, government or business needs.

The 3D virtual actual city can be employed as a greatly improved yellow page concept that goes from point of interest examination, to purchase, all in one sequence. A user can select either an object (such as building in the virtual city) or through a listing find a business, attraction, real estate investment, etc. The user can examine all the available information within the objects database and web site by selecting all the options in the object. The user can also go to the corresponding web site and "purchase" products and services available on their web site.

The 3D virtual actual city can be used as a market research gathering tool for business, city and product information. The 3D virtual actual city can be used to create a database of dynamic market information for sales. For instance, the 3D virtual actual city can be used to enable an advertising client to know that a user went to his web site through the 3D virtual actual city. The cached information can be gathered from the user when he goes online (such as: what building or object did the user go to first?, what information did they look for?, how long did they spend there? etc.). This provides a database of market information that describes what, when, how and where people go in a city when they are searching for information. Thus, user behavior information can also be tracked using the present invention.

The 3D virtual actual city can be employed to create a generation of mini products such as individual promotional CDs which showcase features of a particular site and business within the area of the 3D virtual actual city and for their specific purpose. These "pull-outs" provide a marketing piece for universities, hotels, attractions, new real estate developments, etc. The parameters of these areas are wallpapers of the outside surrounding areas. In other words, if I walk out the door of a hotel and walk around the building, the buildings across the street become a panoramic wall view and are the end boundry of my environment, while the interiors of my building may be included in my "pull-put".

The 3D virtual actual city can be employed as a retail DVD director, tour book, and comprehensive map for sale. This could be strictly a map and guide book with tourist information for direction and travel information.

The 3D virtual actual city can be employed as a historical archive of a city such as the City of Chicago architecture from year to year with potential highlights and points of interest. Over time as the city changes, these changes can be recorded and can enable the user to see the city, part of the city or specific locations at different time periods. The 3D virtual actual city can also go back in time (from when it was created) for an even more historical perspective. For instance, multiple buildings on one location which have been torn down and replaced could be viewable and accessible using the 3D virtual actual city of the present invention.

The present invention can also be employed to create specific 3D virtual actual cities for certain industry uses and can be used to become an interface to link or relate multiple databases that pertain to that industry and that contain data that is important to the end users. The 3D virtual actual city creates menus of humanistic, visually understandable perspectives, and that organizes, binds and makes available all pertinent information when accessing an object.

For example, the 3D virtual actual city can be employed to provide a consistent, understandable and easy to use interface to access city service informational databases for citizens, zoning regulators, land developers, assessor's offices, and other governmental and non-governmental agencies.

In another example, the 3D virtual actual city can be employed as a fire and safety tool to determine street and building locations, hazardous material situations, evacuation routes, water main sites, etc. The 3D virtual actual city can also be used to assist fire, police and other like personal in emergency situations where such people need to immediately become familiar with a location such as a high-rise building.

In another example, the 3D virtual actual city can be employed as a police and home security tool. The 3D virtual actual city can be employed to enable coordination of various policing bodies, video cameras, internal databases, specific locations and routes combined with internet or other network connections to provide safeguarding protection.

In another example, the 3D virtual actual city can be employed as a planning and urban development tool. The 3D virtual actual city can be employed for shadow casting problems, landscaping, traffic flow, and opposition concerns to be addressed before a development is started or in other situations.

In another example, the 3D virtual actual city can be employed as a plan and tree inventory/planning tool for park districts and forest preserves.

In another example, the 3D virtual actual city can be employed as a utility service tool such as for "J.U.L.I.E." in the Chicago metropolitan area. The 3D virtual actual city can be employed for providing comprehensive, visual location information for electric lines, gas pipes, water and sewer lines, etc.

In another example, the 3D virtual actual city can be employed as an economic development tool to reveal the unrealized "big picture possibilities" to attract a greater number of potential property investors and other interested in the city.

It should thus be appreciated that the 3D virtual actual city can be employed for additional different purposes as employment location, sales route planning, real estate directory, real time catalog, and a variety of other uses.

The 3D virtual actual city of the present invention provides a virtual environment make access to large amounts of information less complicated, faster to use and in a format that is completely natural to the user. The 3D virtual actual city of the present invention provides the next generation medium for actual city or environmental information distribution. The present invention also facilitates the gathering and collecting of information regarding user behavior which can be tracked while the user is using any of the above embodiments of the present invention.

General Database Software Structure for One Implementation of the Present Invention The following generally sets forth a database and software structure for one implementation or embodiment of the present invention. One embodiment of the present invention includes a 3D-city database and a city guide/business directory database. One alternative embodiment also includes a client advertisement database. It should be appreciated that other databases could be employed in accordance with the present invention. It should also be appreciated that these databases could also be a single database with different files.

One embodiment of the present invention includes a 3D-city explorer software, 3D-interior navigator software, guide/directory browser software, client advertisement viewer software, script player software, and live update software.

In this embodiment, the 3D city explorer software provides the virtual reality user interface which facilitates real-time rendering of the virtual reality environment on a user display, navigation within the displayed virtual reality environment, and interaction with active 3D-objects. The 3D city explorer software also interacts with the guide/directory browser upon user request to display or go to client ad screens.

The guide/directory browser software implements the graphical user interface to city guide/business directories and client ad packages and provides browsing of various site and businesses listings, content searching, sorting and filtering, multimedia and web site display. The guide/directory browser software Interacts with the 3D city explorer upon user request to highlight search results on 3D-city map, or display or go to a site in the virtual city.

The online update client software provides program automatic updates via the internet or other suitable data network. The online update client software keeps the program database and code up-to-date by downloading necessary update packages from the implementer or implementer update server.

The virtual tour manager software facilitates virtual tours within the virtual city environment and automatic browsing of client ad packages content (such as multimedia presentations and slide shows). The virtual tour manager software is also used as an engine for program interactive help (which in one embodiment is a set of virtual tours used to explain the features of the system). This software may also provide both recording and playback of user-defined virtual tours.

One embodiment of the present invention includes an interactive web site, an online update server and an online client data server.

The interactive web site formed from a generic web site template (for any city), and provides general information about the product for users and potential or current clients. The interactive web site includes e-commerce support for online ordering of selected city DVDs, as well as client initial registration and online purchase of ad packages. The interactive web site may be linked to other virtual city web sites for other cities. The interactive web site interacts with the online client data server upon visitor request to create and register a new client account on the server.

The online update server software is an internet-enabled software which serves updates to client applications. When started, the online update server software can be configured to poll the update server for available updates. If new content is available for particular client, it will be assembled by the server into one integral a package based on current client configuration, and granted for download.

The online client data server has internet enabled software for providing a web user interface for implementing management of a virtual city client online account. The online client data server is architecturally integrated with the virtual city web site. This enables clients to enter/modify text and graphics for their ad packages and submit this information for scheduled updates. The online client data server includes e-commerce support (for online ordering of certain types of add-on option) and online technical support.

One embodiment of the present invention includes architectural photography processing tools, 3D city design tools, guide/directory design tools, and online update tools.

The architectural photography processing tools are a set of software utilities and technical documentation for photographers and software engineers. These are used for collecting and processing raw photo data obtained during architectural photographing of city target area.

The 3D city design tools are a set of software utilities and technical documentation for 3D-artists and software engineers. The 3D city design tools are used in 3D-City production line for creating, processing, and integrating 3D-objects into the virtual city computer model as described above.

The guide/directory design tools are a set of software utilities and technical documentation for 3D-artists and software engineers. The guide/directory design tools are used in ad packages and guide production line for ad design and integration of client data and multimedia content into program database.

The online update tools are a set of software utilities and technical documentation for system administrators and software engineers. The online update tools are used for collecting and processing client online data updates, assembling and publishing product update packages on the internet server.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A computer-implemented system configured to maintain and cause a display of a virtual city model of an actual city, said system comprising:
   at least one data storage device which stores a plurality of instructions and stores data representing:
      (a) a plurality of city elements, the city elements being three-dimensional representations of actual elements within an actual boundary of the actual city, at least one of said city elements including an image skin applied to a three-dimensional structure, at least two of said city elements being anchor city elements, said anchor city elements representing spaced-apart actual elements having identifiable architectural characteristics within said actual city, said anchor city elements encouraging a user to explore any city elements between said anchor city elements, said boundary displayable by a display device and said city elements displayable by the display device within said display of the boundary,
      (b) at least one advertiser information set predetermined to be associated with at least a portion of at least one of said city elements, wherein said city element represents a place of business of an advertiser, and
      (c) a boundary display effect, said boundary display effect being configured to increasingly obscure an area outside said boundary; and
   at least one processor configured to execute said instructions to:
      enable the advertiser to lease at least one advertiser information set such that, upon each payment of a recurring predetermined lease fee during a corresponding lease period, the advertiser controls at least a portion of the data of the advertiser information set associated with said portion of said city element, and
      enable the user of the virtual city model to:
         (a) select a viewing angle from a plurality of different viewing angles for viewing the city elements within the boundary displayable by the display device,
         (b) navigate the different city elements within the boundary displayable by the display device at each selected viewing angle,
         (c) select at least a portion of each of a plurality of the city elements,
         (d) cause a display of at least a portion of the advertiser information set associated with the selected portion of the city element, and
         (e) display the boundary display effect as the area outside said boundary.

2. The computer-implemented system of claim 1, wherein the viewing angle is one selected from the group consisting of: a perspective view, a top view, a driving car view, a moving train view, a flying helicopter view, a moving boat view, an observation deck view, a walking pedestrian view, and a user-defined view.

3. The computer-implemented system of claim 1, wherein the advertiser information set includes at least one selected from the group consisting of: an advertiser name, an advertiser address, an advertiser phone number, a set of advertiser hours of operation, an advertiser description, an advertiser website address, an advertiser website address hyperlink, an advertiser multimedia product, advertiser product information, and advertiser service information.

4. The computer-implemented system of claim 1, wherein the actual city is selected from the group consisting of: a real city, a real town, a real village, a real province, a real county, a real state, a real country, a real ward, a real community, a real university campus, and a real college campus.

5. The computer-implemented system of claim 1, wherein the actual city elements are selected from the group consisting of: businesses, buildings, attractions, services, facilities, objects, and inhabitants.

6. The computer-implemented system of claim 5, wherein the businesses are selected from the group consisting of: professional offices, trade offices, banks, factories, real estate offices, hotels, motels, restaurants, diners, coffee shops, bars, night clubs, casinos, stores, shops, malls, and salons.

7. The computer-implemented system of claim 5, wherein the buildings are selected from the group consisting of: skyscrapers, towers, temples, churches, halls, apartments, house, condominiums, theaters, libraries and museums.

8. The computer-implemented system of claim 5, wherein the attractions are selected from the group consisting of: theaters, museums, architectural landmarks, prominent and/or historical buildings, sculptures, art galleries, aquariums, planetariums, sports stadiums, scenic vistas, amusement parks, fountains, beaches, and bodies of water such as rivers, lakes, and canals.

9. The computer-implemented system of claim 5, wherein the services are selected from the group consisting of: city services including police, fire and emergency services; transportation services including taxis, buses, trains, trams, shuttles, and subways; medical services including hospitals, urgent care centers and doctor's offices; academic services including schools, universities, libraries and colleges; and religious services including temples, churches, synagogues, chapels, mosques and other places of worship.

10. The computer-implemented system of claim 5, wherein the facilities are selected from the group consisting of: plazas, squares, convention centers, convocation centers, stadiums and arenas, airports, train stations, bus depots and taxi stands.

11. The computer-implemented system of claim 1, which includes a first undetailed area and a different first detailed area within the boundary, wherein the first undetailed area includes the street layout of a certain portion of the city without detailed city elements and the first detailed area includes the street layout and selected city elements in the detailed area, and wherein the processor is configured to execute said instructions to display a composite of said boundary display effect and said first undetailed area.

12. The computer-implemented system of claim 11, wherein the first detailed area is spaced from a portion of the boundary and the first undetailed area is between said portion of the boundary and said first detailed area.

13. A method of creating a computer-implemented virtual city model of an actual city on at least one computer storage medium, the method comprising:
   collecting geographic data relating to the actual city and storing said geographic data in a first database;
   analyzing the stored geographic data;
   designating at least one set of physical boundaries for the virtual city model based on the analysis of the geographic data, the physical boundaries corresponding to at least one selected from the group consisting of: natural boundaries of the actual city and man-made boundaries of the actual city;
   collecting city element information relating to a plurality of different actual city elements and storing said city element information in a second database, the city element information including data representing three-dimensional representations of the plurality of actual city elements within said physical boundaries of the actual city;

analyzing the stored city element information;

creating a city technology database for the virtual city model of the actual city using said analysis of the city element information in relation to the geographic data;

creating an advertiser-accessible customer technology database wherein data stored in the customer technology database is predetermined to be associated with at least one of the city elements in the city technology database, wherein said at least one of the city elements is a place of business of an advertiser;

enabling the advertiser to lease a portion of the data of the customer technology database which is associated with said city element which is the place of business of the advertiser such that, upon each payment of a recurring predetermined lease fee during a corresponding lease period, the advertiser controls said portion of the data of the customer technology database;

creating a plurality of displayable three-dimensional city objects for the virtual city model of the actual city, said city objects corresponding to the city elements, at least two of said city elements being anchor city elements, said anchor city elements representing spaced-apart actual elements having identifiable architectural characteristics within said actual city, said anchor city elements encouraging a user of the virtual city model to explore any city elements between said spaced-apart actual elements, at least one of said displayable three-dimensional city objects including an image skin applied to at least one three-dimensional structure;

applying a boundary display effect to an area outside said physical boundary, the boundary display effect increasingly obscuring said area outside said physical boundary;

associating information from the customer technology database with the city technology database;

associating the city technology database with the city objects; and generating a user-executable version of the virtual city model and storing said generated executable version of the virtual city model on a the computer storage medium, wherein at least a portion of the city technology database data controlled by the advertiser is presentable to the user of the virtual city model.

14. The method of claim 13, wherein two sets of physical boundaries are designated, the first set of physical boundaries representing an inner area of the virtual city model, and the second set of boundaries representing an outer area of the virtual city model which encompasses at least part of the inner area, and wherein the boundary display effect is applied to at least one displayable three-dimensional city object within said outer area of the virtual city model for increasingly obscuring said at least one displayable three-dimensional city object.

15. The method of claim 13, wherein the data from the customer technology database presented to the user includes at least one selected from the group consisting of: an advertiser name, an advertiser address, an advertiser phone number, client hours of operation, an advertiser description, an advertiser website address, an advertiser website address hyperlink, advertiser multimedia, advertiser product information, and advertiser service information.

16. An interactive computer-implemented system comprising:
at least one processor; and
at least one data storage device storing a plurality of instructions and data wherein, upon execution of said instructions by the at least one processor, said instructions cause:
(a) a virtual three-dimensional representation of a plurality of actual elements in proportional spatial relation to the position of said actual elements in an actual environment to be displayed, wherein at least two of said actual elements are anchor city elements having identifiable architectural characteristics within said actual city, said anchor city elements encouraging a user to explore any virtual three-dimensional representation of any actual elements between said anchor city elements, wherein at least one of said actual elements is an actual business, and wherein at a portion of said virtual three-dimensional representation includes an image skin applied to a three-dimensional structure,
(b) at least one advertiser interface to enable an advertiser of said business, upon each payment of a recurring predetermined lease fee during a corresponding lease period, to control at least a portion of data describing said business, and
(c) at least one user interface to send and receive data to:
(i) cause a display of a viewing angle selected from a plurality of different viewing angles for viewing the actual elements,
(ii) select the actual element including said business,
(iii) cause a display of at least a portion of the data describing said business, and
(iv) cause a display of a boundary display effect to be applied to at least a portion of the virtual three-dimensional representation of the plurality of actual elements, said boundary display effect increasingly obscuring said portion of the virtual three-dimensional representation.

17. The system of claim 16, wherein at least a portion of the system is implemented through a web site.

18. The system of claim 17, wherein at least a portion of the data is updated through the web site.

19. The system of claim 16, wherein the actual elements are elements of an actual geographic location, said geographic location being selected from the group consisting of: an actual city, an actual town, an actual village, an actual province, an actual county, an actual state, an actual country, an actual ward, an actual community, an actual school campus, an actual shopping center, and any geographic subsets thereof.

20. A method of creating a computer-implemented three-dimensional data model of an actual environment on a computer storage medium, the method comprising:
collecting, storing, and analyzing element display data, said element display data enabling a processor to cause a display of a three-dimensional representation of each of a plurality of actual elements and the position of said elements in relation to one another in the actual environment, at least two of said actual elements being anchor city elements having identifiable architectural characteristics within said actual environment, the display including at least one image skin applied to at least one three-dimensional structure;

collecting and storing element information predetermined to be associated with at least one of the elements, wherein said element is a place of business of an advertiser;

soliciting and collecting a recurring predetermined lease payment from the advertiser during a corresponding lease period and, in exchange, enabling the advertiser to control at least a portion of the element information associated with said element during said lease period;

generating a user-executable version of the data model of the actual environment from the element data and the element information, wherein at least a portion of the element information controlled by the advertiser is displayable to a user of the data model, wherein said anchor city elements encourage the user to explore any actual elements between said anchor city elements, and wherein at least a portion of the display of the three-dimensional representation of each of the plurality of actual elements includes a boundary display effect for increasingly obscuring said portion of the display; and storing said user-executable version of the data model of the actual environment on said computer storage medium.

21. The method of claim 20, which includes updating the element data and the element information.

22. A computer-implemented system for enabling interaction with an actual environment, said system comprising:

at least one processor; and at least one data storage device which stores a plurality of instructions and data, wherein, upon execution of said instructions by the at least one processor, said instructions cause:

(a) a virtual three-dimensional representation of a plurality of actual elements in proportional spatial relation to the position of said actual elements in the actual environment to be displayed, wherein at least two of said actual elements are anchor city elements having identifiable architectural characteristics within said actual environment, wherein at least one of said actual elements is an actual business, wherein at least a portion of the three-dimensional representation of the plurality of actual elements includes a boundary display effect for increasingly obscuring said portion of the three-dimensional representation, and wherein said virtual three-dimensional representation includes an image skin applied to a three dimensional structure, and (b) an advertiser interface including an advertiser data server to send and receive data from an advertiser of said actual business to enable the advertiser to:

(i) register and purchase an online advertisement account predetermined to be associated with said actual business of the actual environment, and (ii) control advertiser data of said actual business through said advertisement account in exchange for paying each of a plurality of recurring predetermined lease fees during a corresponding lease period; and (c) a user interface including a user data server to send and receive data to enable a user to:

(i) navigate the actual environment to view the at least two anchor city elements and at least one actual element between said anchor city elements, and (ii) interact with at least the actual business in the actual environment to access the advertiser data associated with said actual business.

23. The system of claim 22, wherein at least a portion of the system is configured to be accessed by the user through a web site.

24. The system of claim 1, wherein said boundary display effect is one selected from the group consisting of: a fading out effect and a fog effect.

25. The system of claim 1, wherein said at least one data storage device stores data representing a North American Industry Classification System (NAICS) classification of at least one of said plurality of city elements.

26. The method of claim 13, wherein said boundary display effect is one selected from the group consisting of: a fading out effect and a fog effect.

27. The method of claim 13, which includes classifying at least one of said plurality of different city elements according to a North American Industry Classification System (NAICS) classification.

28. The system of claim 16, wherein said boundary display effect is one selected from the group consisting of: a fading out effect and a fog effect.

29. The system of claim 16, wherein the instructions cause at least a portion of said virtual three-dimensional representation of said plurality of actual elements to be classified based on a North American Industry Classification System (NAICS) classification.

30. The method of claim 20, wherein said boundary display effect is one selected from the group consisting of: a fading out effect and a fog effect.

31. The method of claim 20, wherein said element information includes a North American Industry Classification System (NAICS) classification.

32. The system of claim 22, wherein said boundary display effect is one selected from the group consisting of: a fading out effect and a fog effect.

33. The system of claim 22, wherein at least a portion of the three-dimensional representation of a plurality of actual elements includes a North American Industry Classification System (NAICS) classification.

* * * * *